M. J. MILMOE & F. B. REDINGTON.
BOX NECKING MACHINE.
APPLICATION FILED JAN. 16, 1913.

1,282,102.

Patented Oct. 22, 1918.
16 SHEETS—SHEET 1.

Witnesses:

Inventors
Michael J. Milmoe
Frank B. Redington
by Linthicum Bell & Fuller
Attys

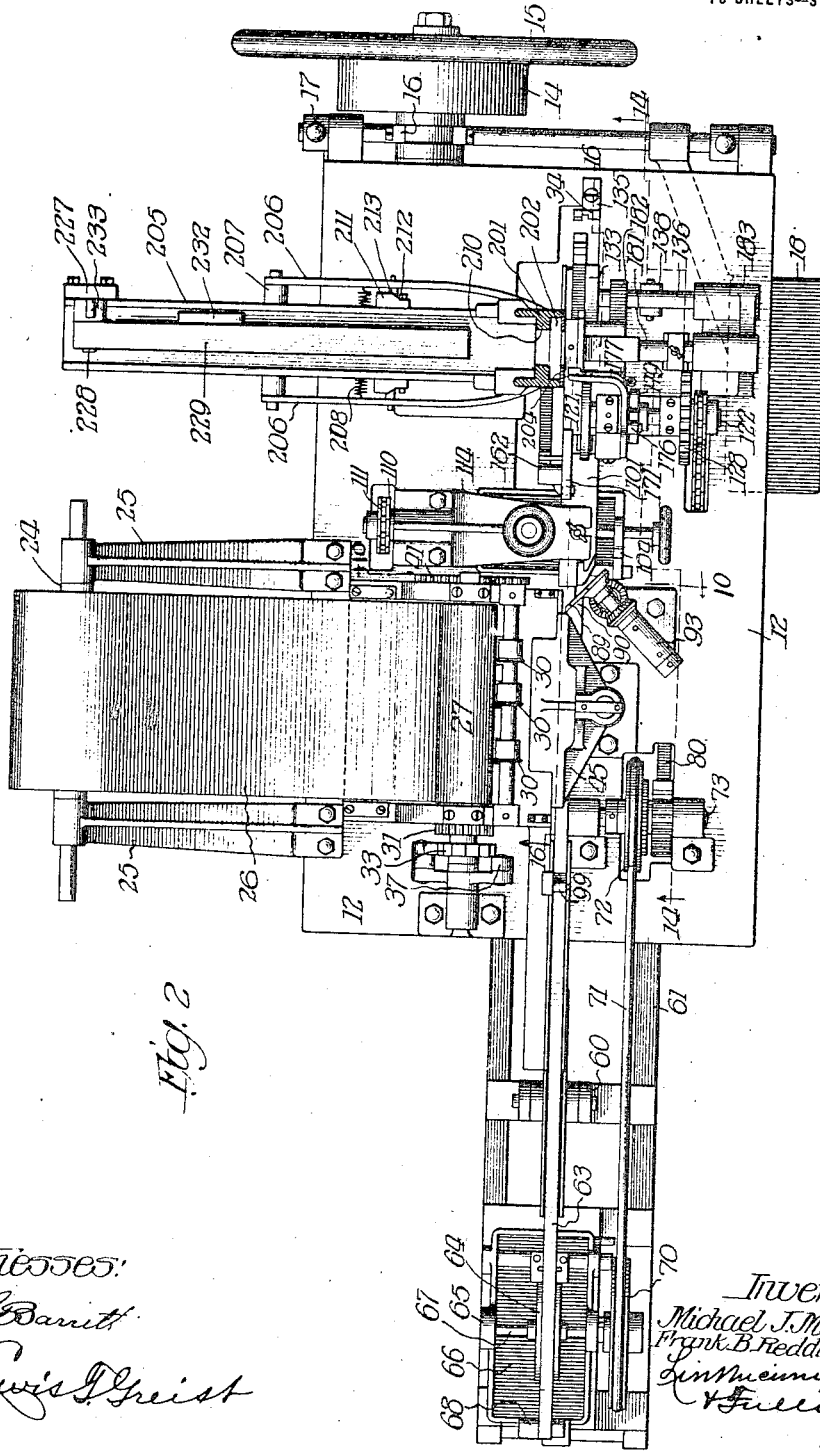

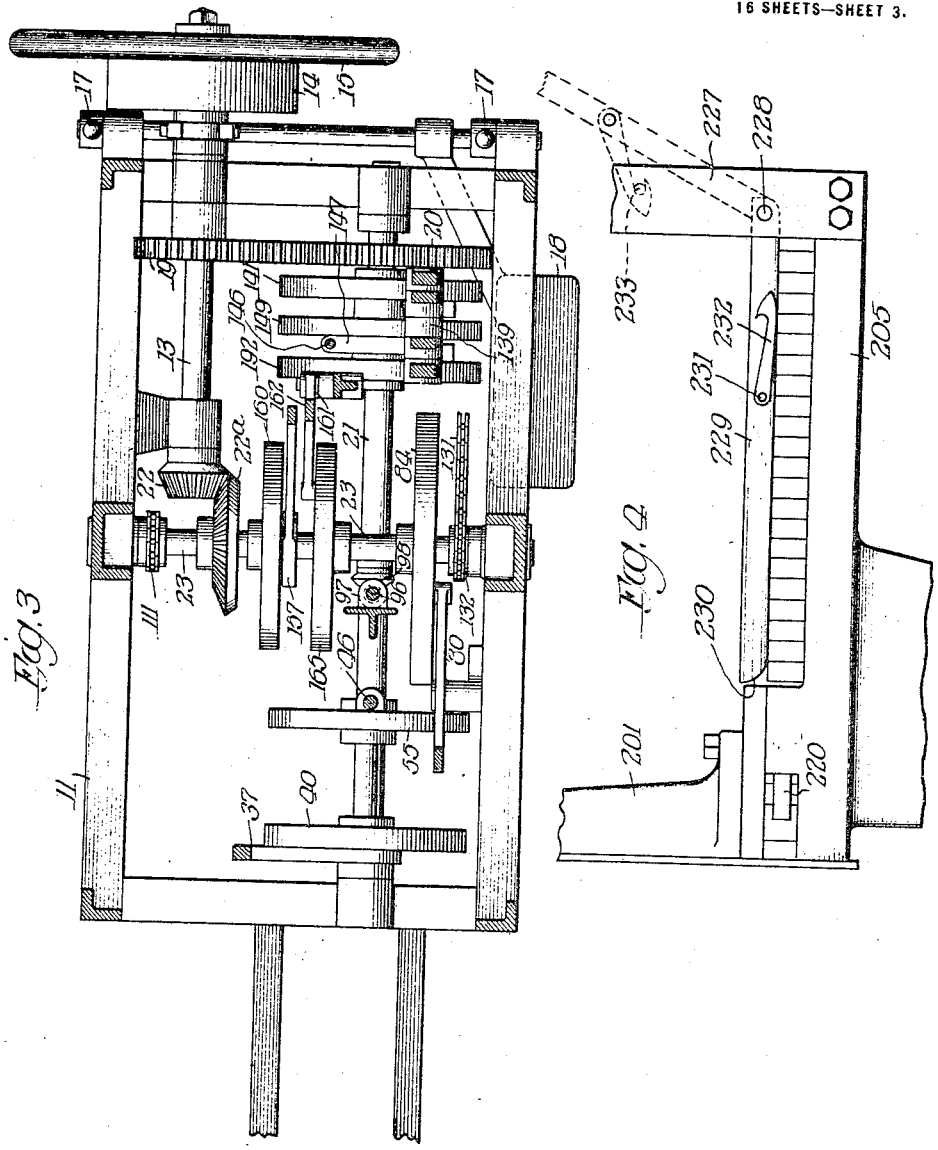

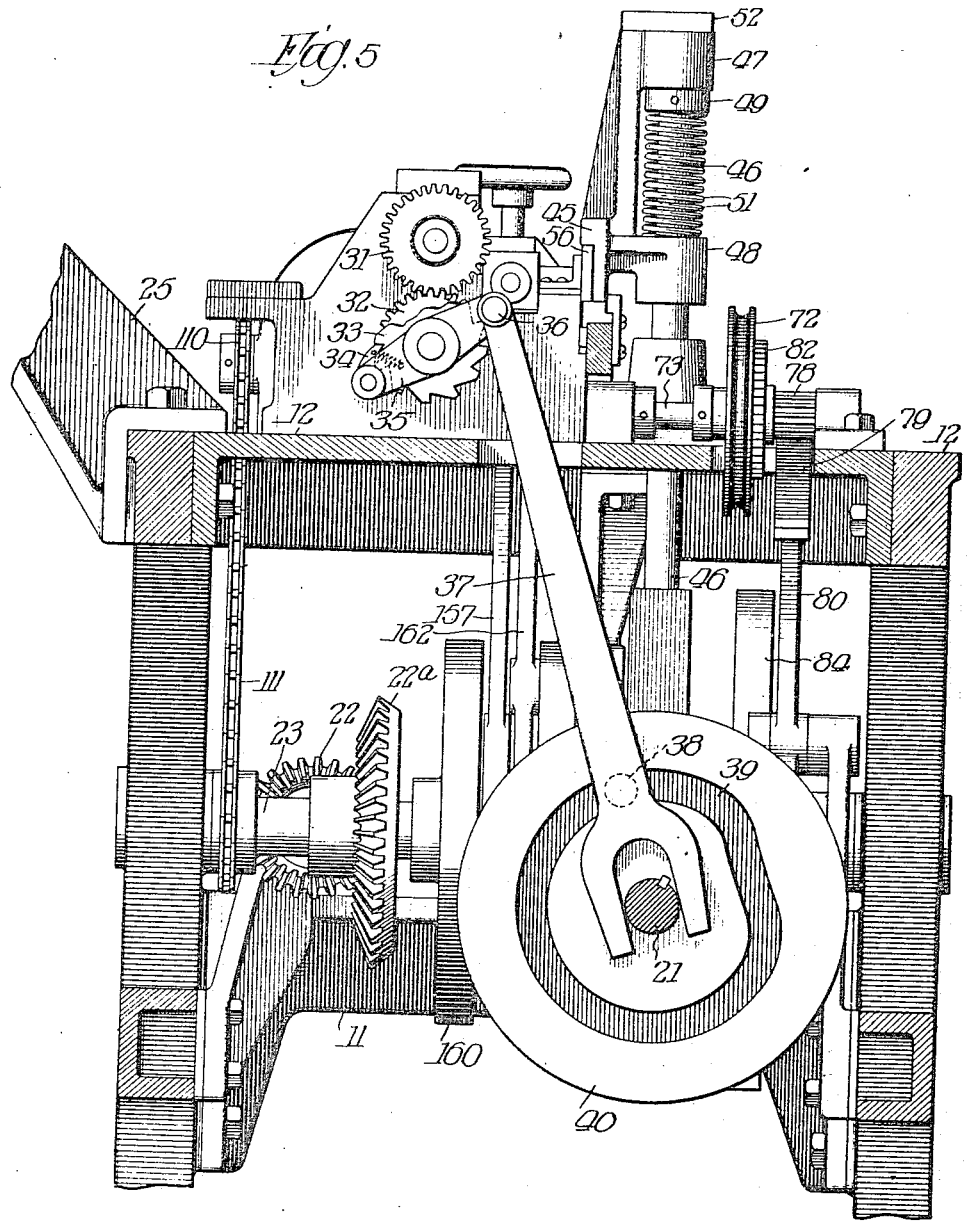

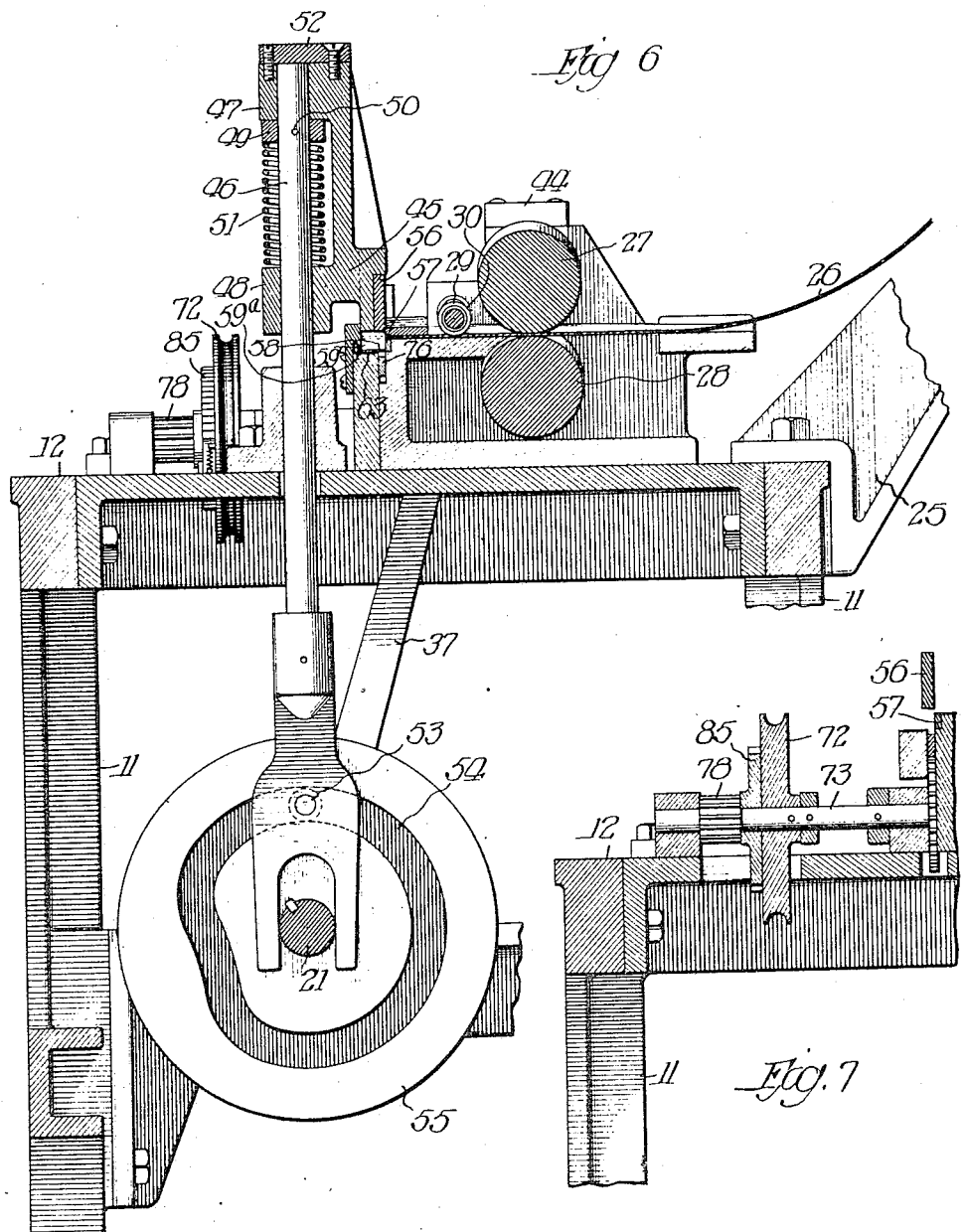

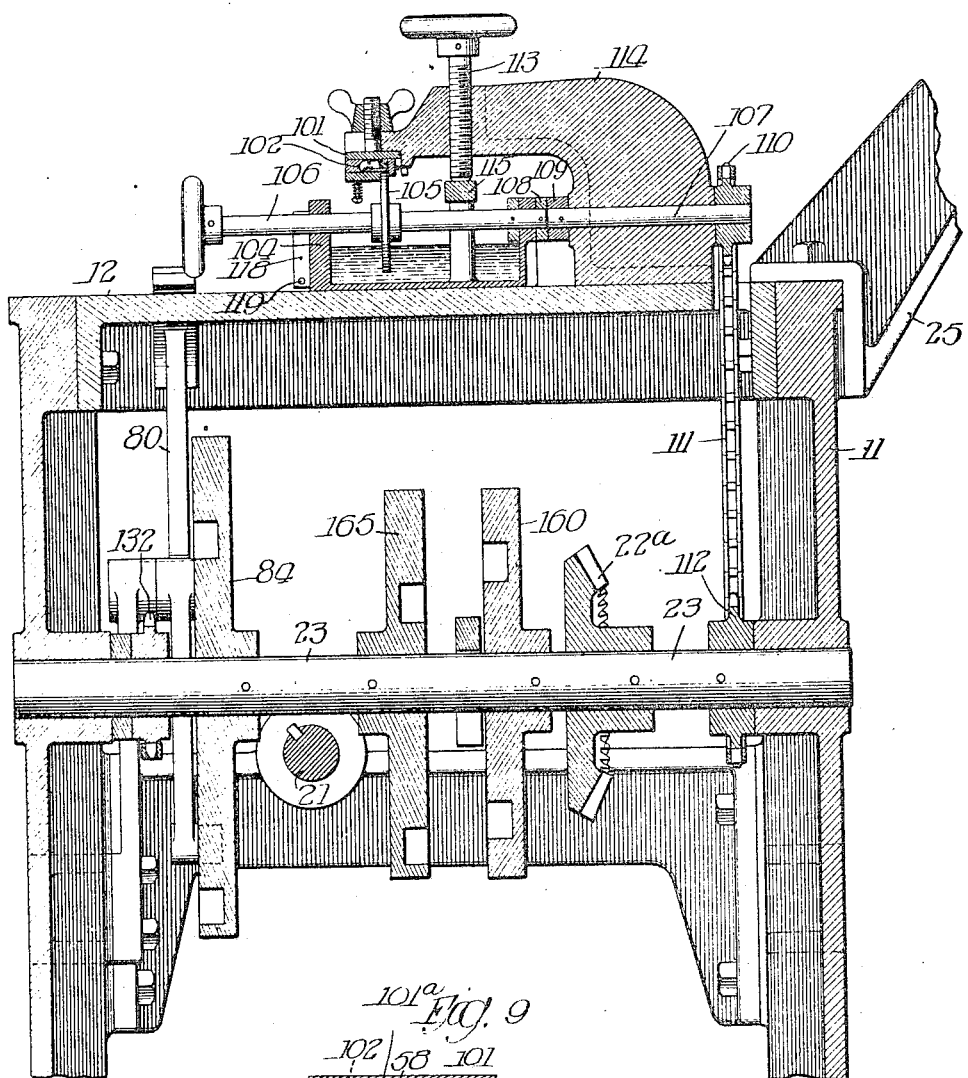

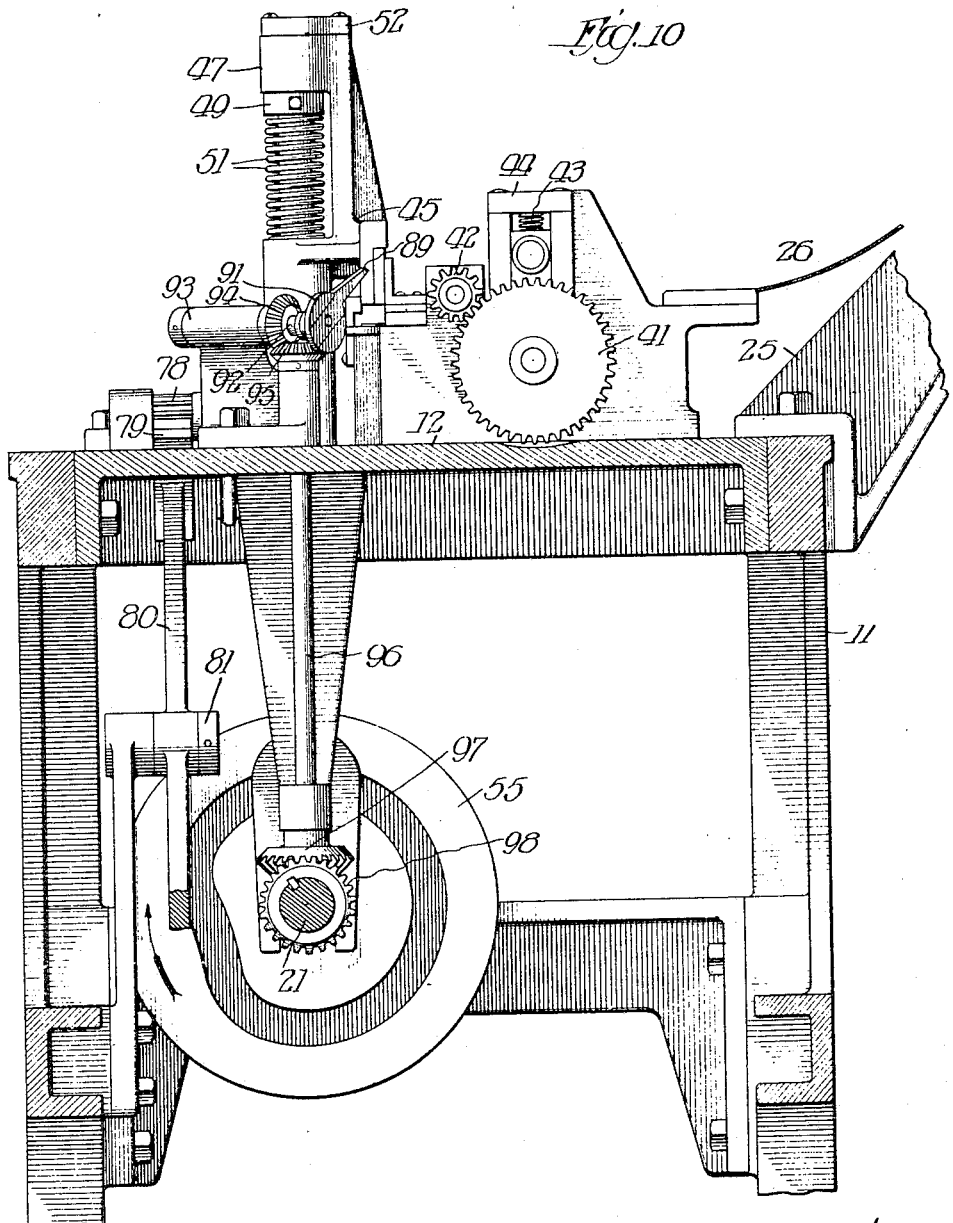

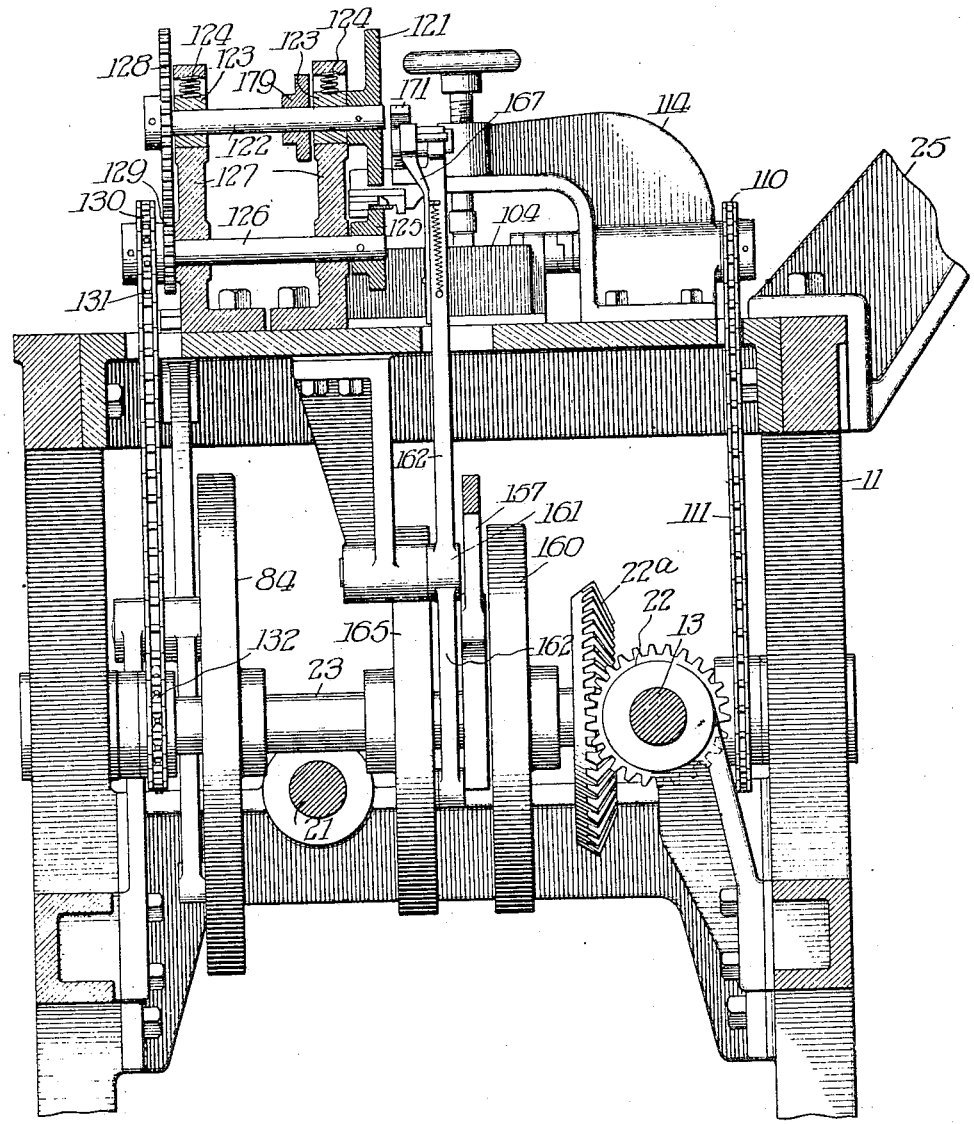

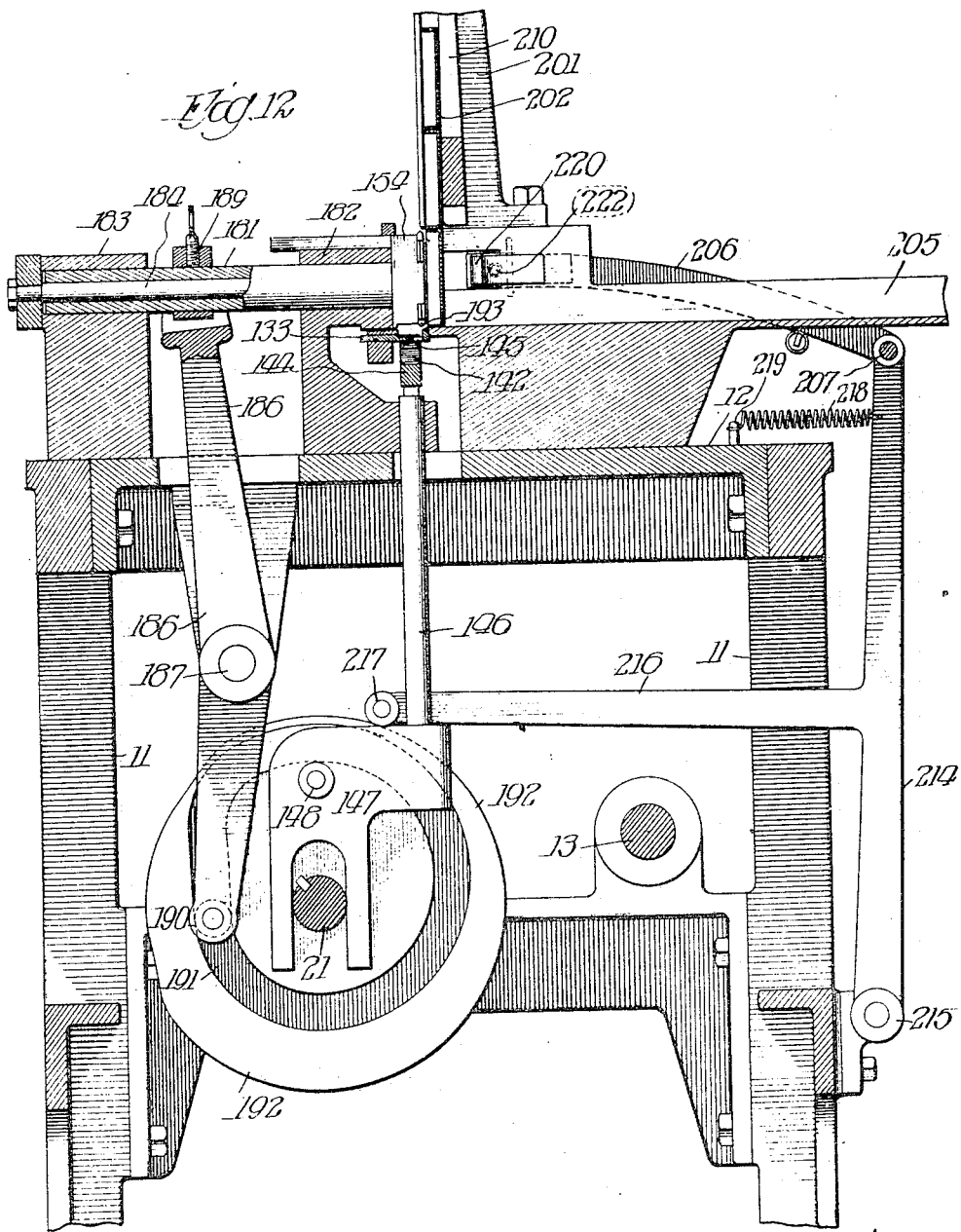

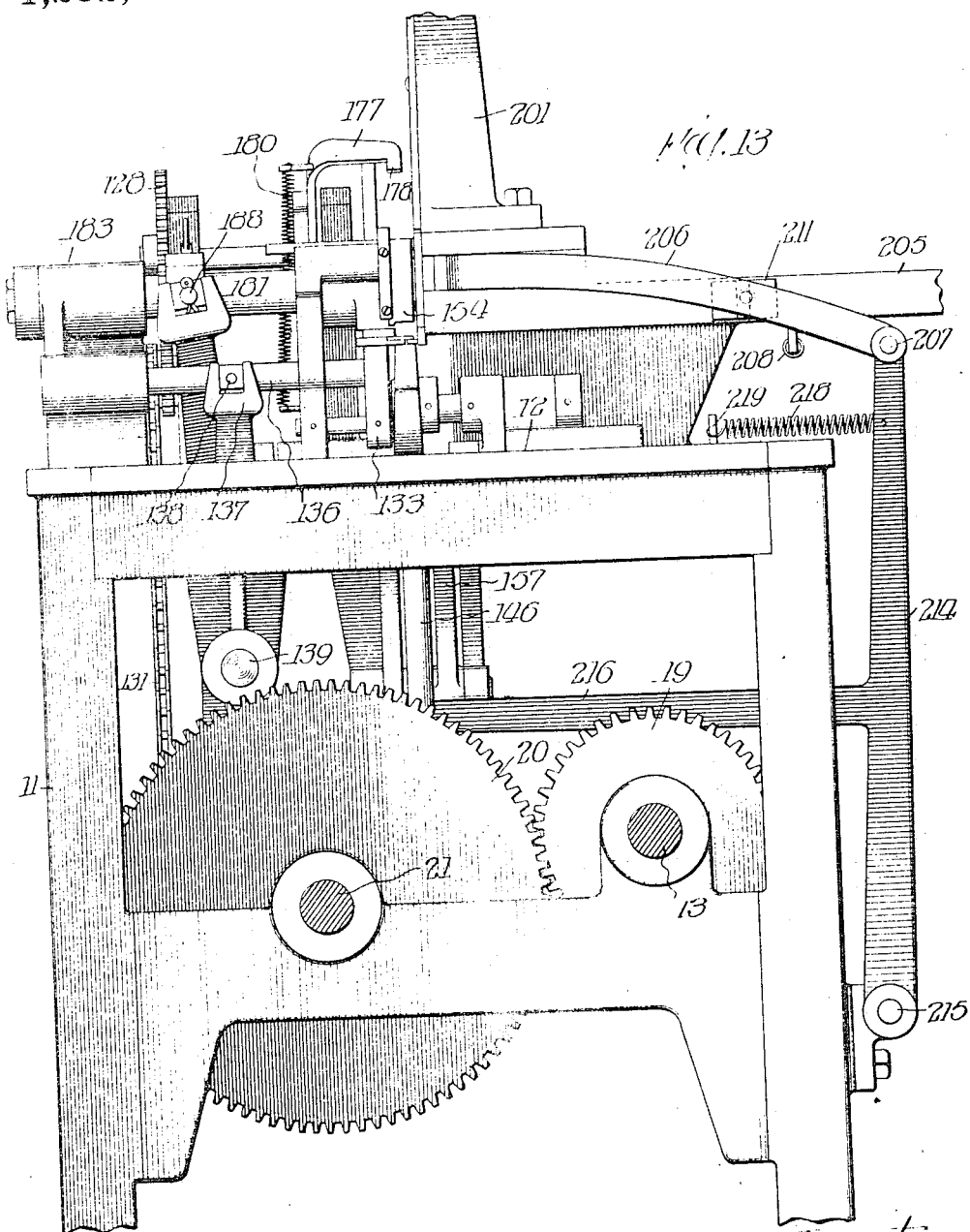

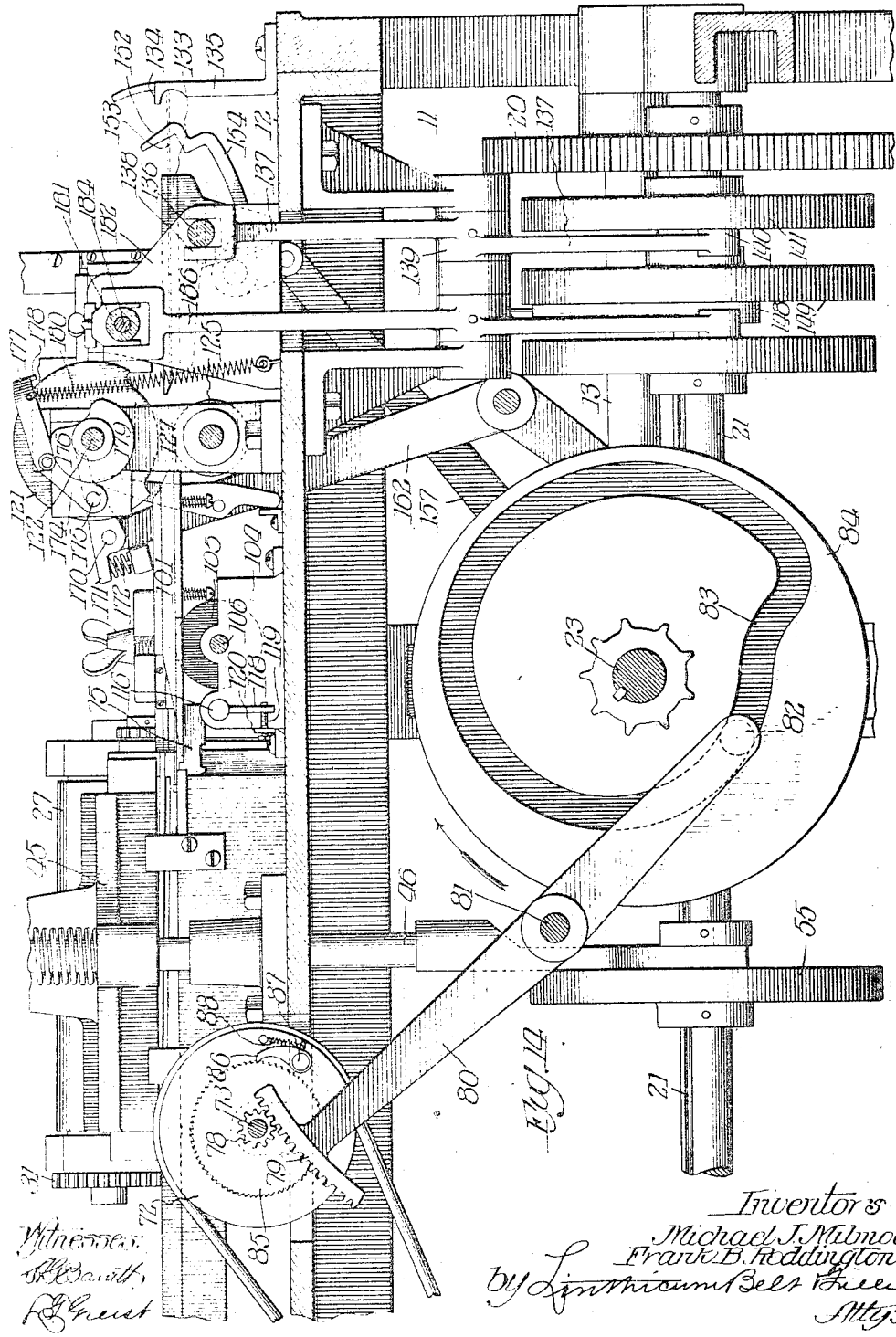

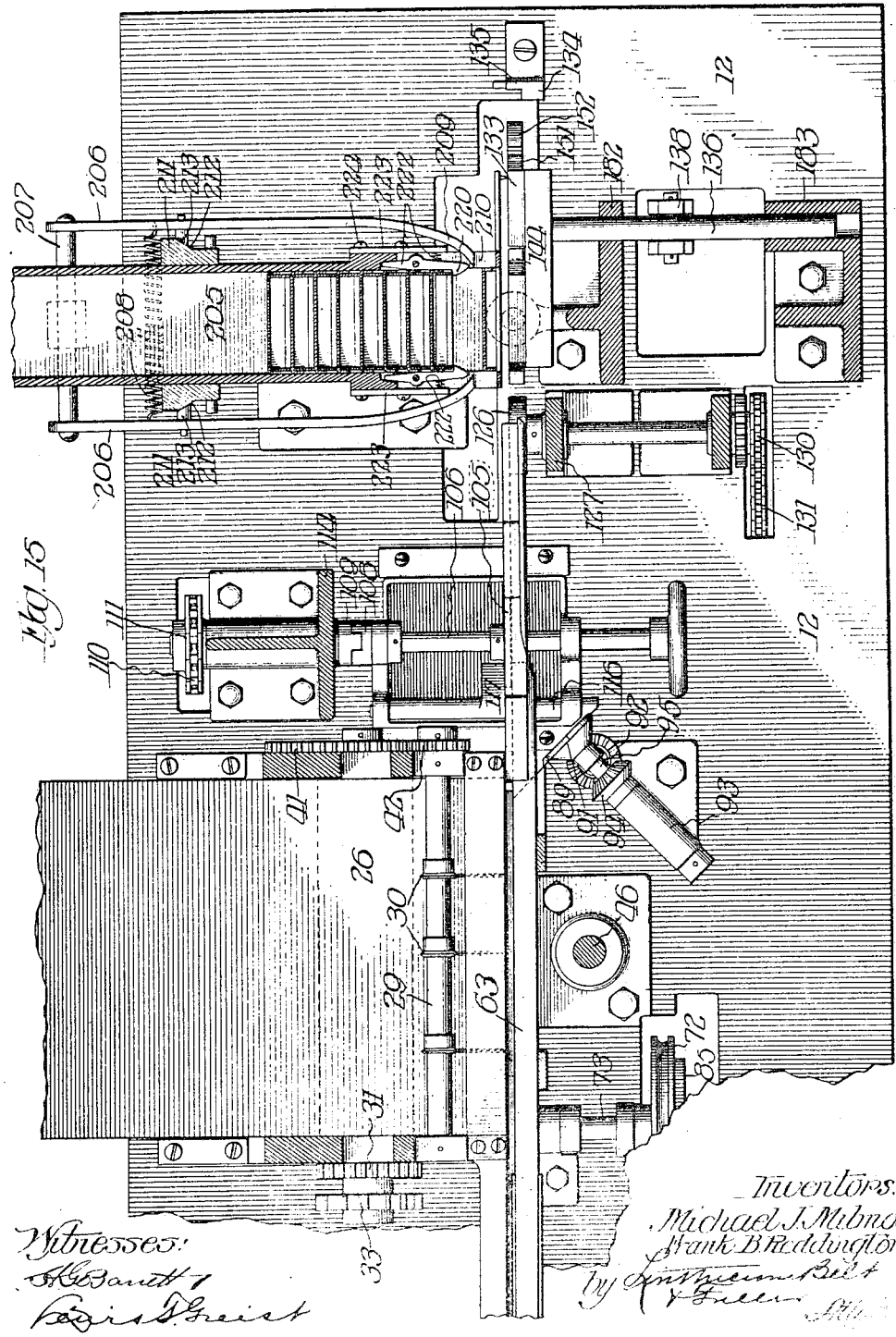

M. J. MILMOE & F. B. REDINGTON.
BOX NECKING MACHINE.
APPLICATION FILED JAN. 16, 1913.

1,282,102. Patented Oct. 22, 1918.
16 SHEETS—SHEET 13.

Inventors
Michael J. Milmoe
Frank B. Reddington

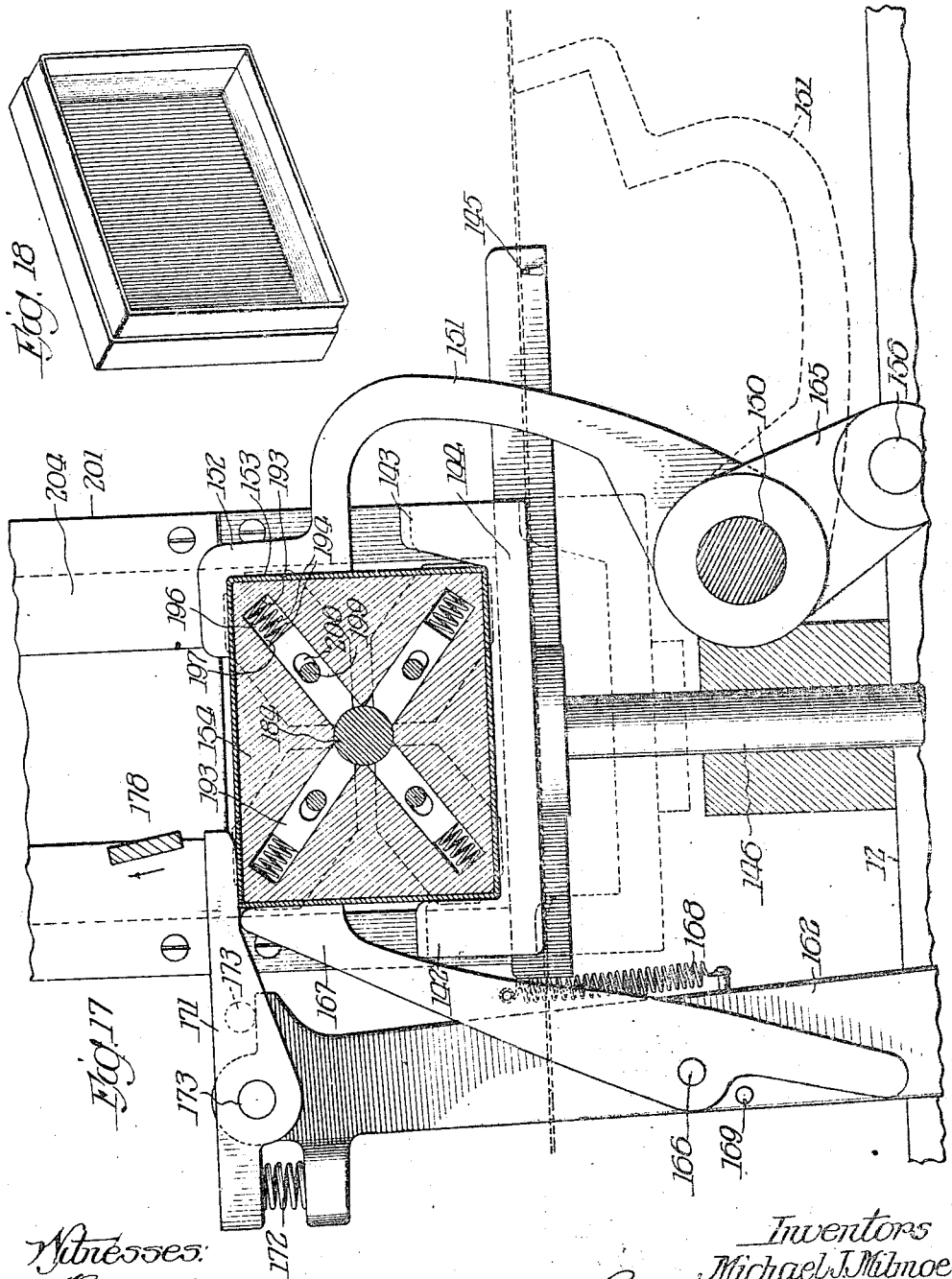

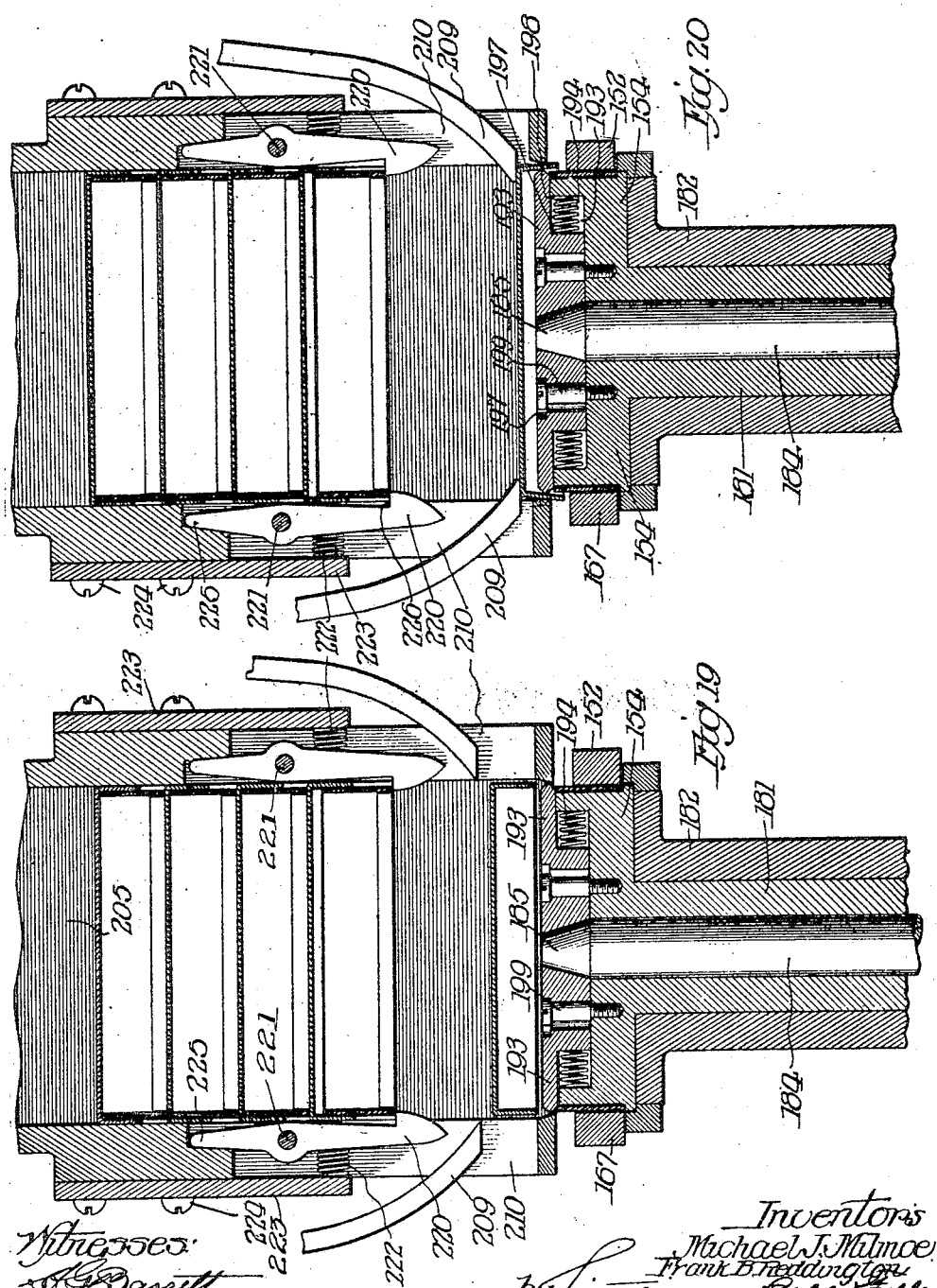

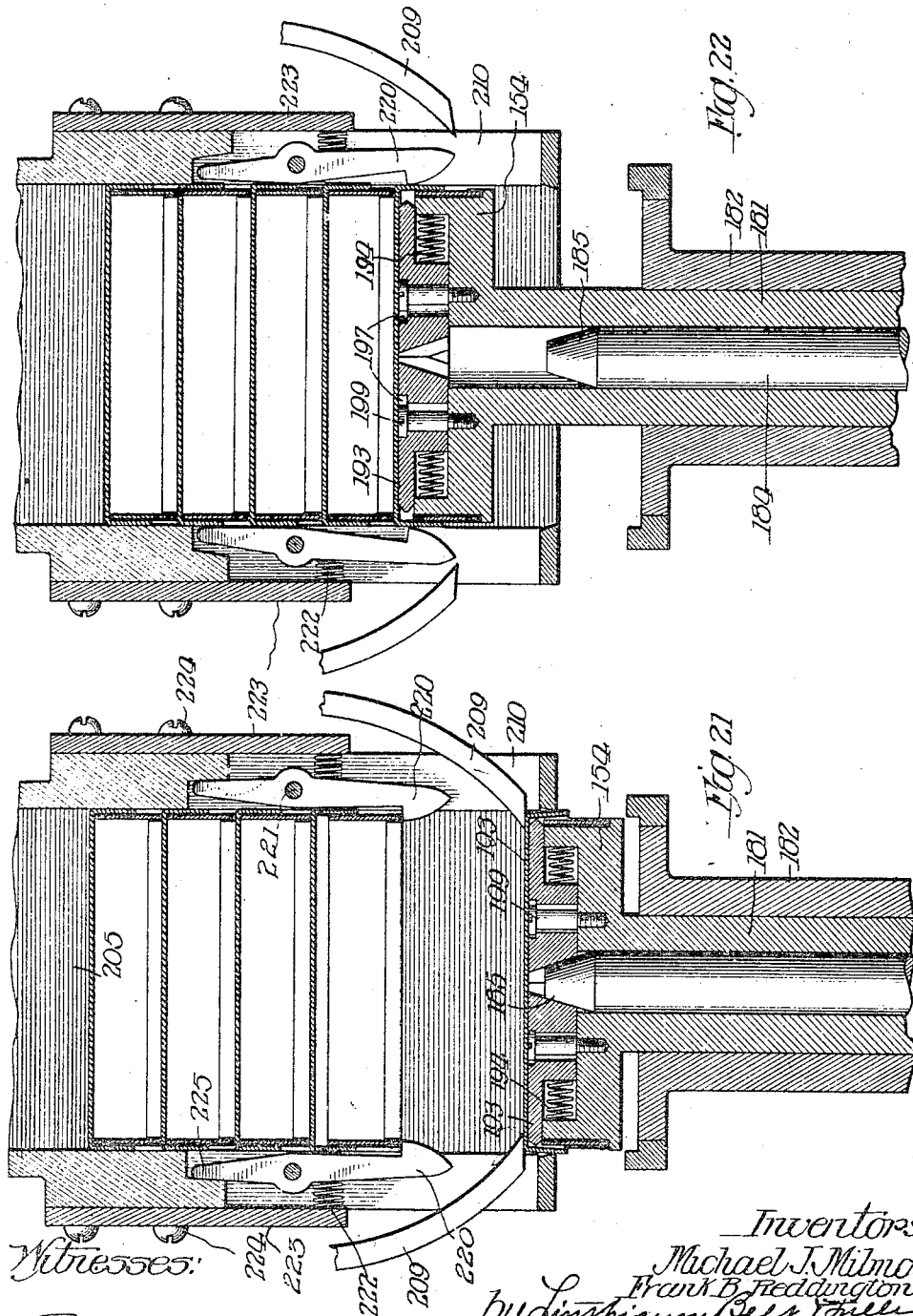

UNITED STATES PATENT OFFICE.

MICHAEL J. MILMOE AND FRANK B. REDINGTON, OF CHICAGO, ILLINOIS, ASSIGNORS TO W. C. RITCHIE & COMPANY, OF CHICAGO, ILLINOIS, A CORPORATION OF ILLINOIS.

BOX-NECKING MACHINE.

1,282,102.   Specification of Letters Patent.   Patented Oct. 22, 1918.

Application filed January 16, 1913. Serial No. 742,370.

*To all whom it may concern:*

Be it known that we, MICHAEL J. MILMOE and FRANK B. REDINGTON, citizens of the United States, residing at Chicago, in the county of Cook and State of Illinois, have invented certain new and useful Improvements in Box-Necking Machines, of which the following is a specification.

In the manufacture of paste board boxes of that two part type comprising a box body and a cover it is usual to provide the body portion with a projecting flange adapted to engage within the cover portion and which is commonly known as a "neck". The neck usually consists of a card board strip seated within and extending around the walls of a box and secured in place by being pasted to the box walls, while as a finish this card board foundation strip is ordinarily covered on the exposed side with a plain or decorative finishing strip of paper which overlaps the projecting edge of the foundation strip and extends down between the neck and the box wall.

This invention has for its object the provision in box making machines of automatic mechanism for the manufacture and insertion of the box neck, including the forming of the card board foundation strip from a web of paste board, the scoring of the same to facilitate a sharp bending at the corners, the pasting of the finishing strip thereon, the bending of this duplex strip and securing the ends together, and the insertion and pasting of the resultant neck within the box,—said mechanism requiring no attention other than to see that an unbroken supply of paper, card board and boxes is maintained.

In order that the invention may be readily understood by those skilled in the art, we have in the accompanying drawings and in the following detailed description based thereon set forth a preferred embodiment of the invention, it being understood that as the construction is capable of modification within wide limits without departure from the essence of the invention, the drawings and description are to be considered in an illustrative sense only and not as limiting the invention other than as may be necessary to sustain the claims in view of the prior art.

In the drawings:

Fig. 2 is a top plan view of the same;

Fig. 3 is a horizontal section on the line 3—3 of Fig. 1;

Fig. 4 is a fragmentary view showing the box discharge chute in side elevation;

Figure 1:
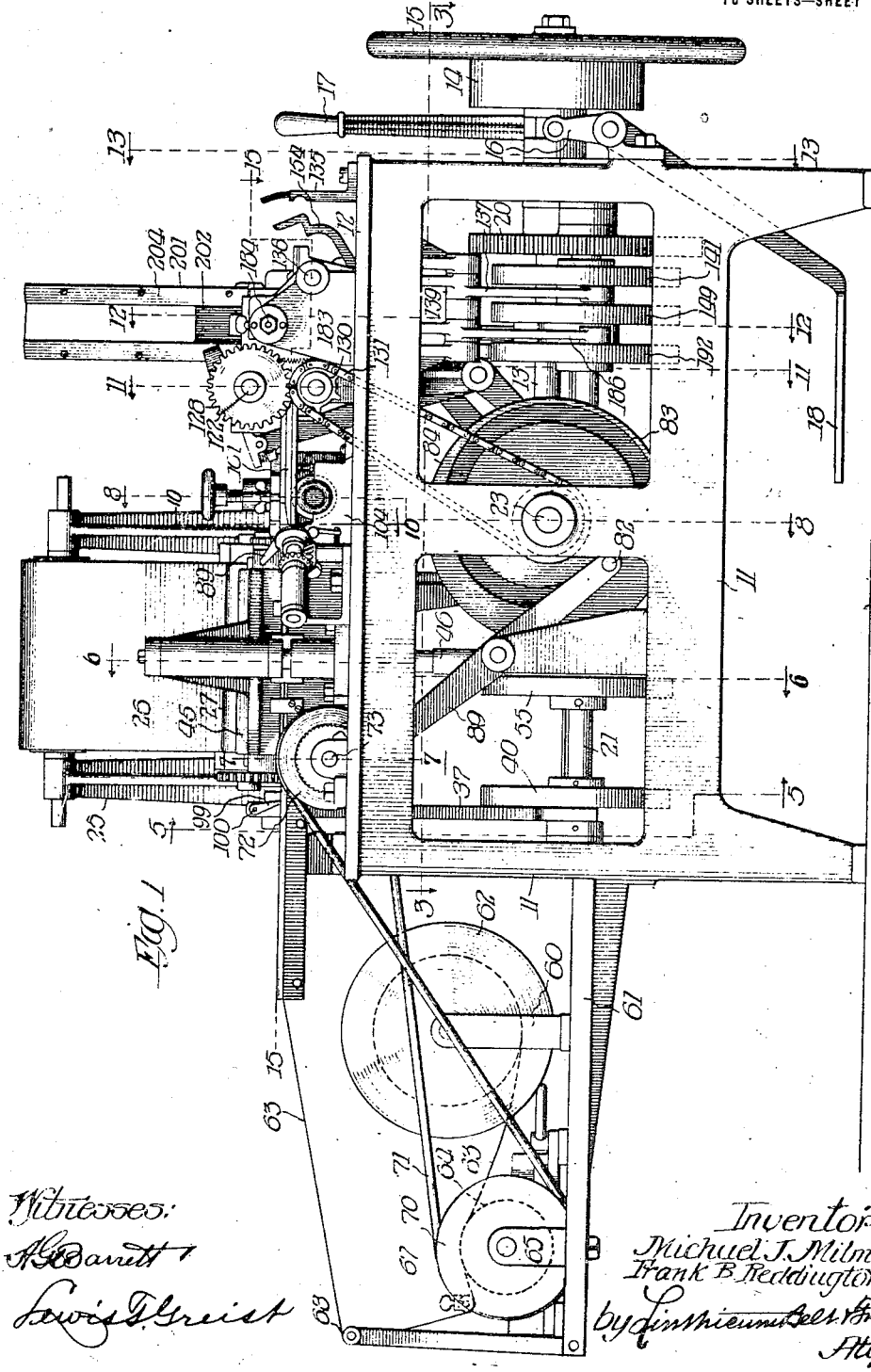
Figure 1 is a front elevation of a box necking machine constructed according to this invention.
Figure 16:
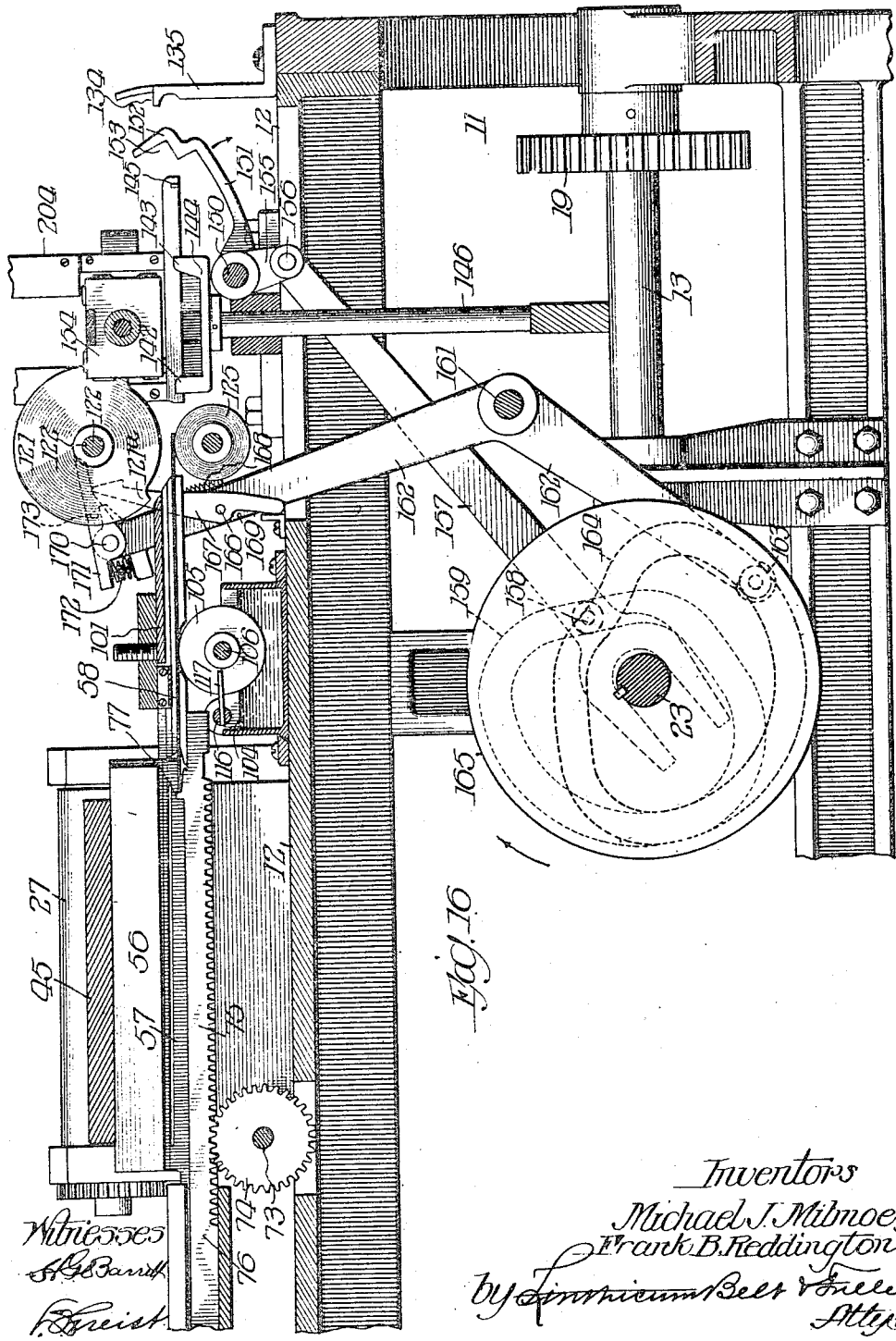

Figs. 5, 6, 7, 8, 10, 11, 12 and 13 are vertical sections taken on the respective lines indicated in Fig. 1, the housing over spring 51 in Fig. 1 being omitted in Figs. 6 and 10;

Fig. 9 is a fragmentary enlarged section through the covering-paper folding mechanism;

Fig. 14 is a vertical section taken on the line 14—14 of Fig. 2;

Fig. 15 is a horizontal section taken on the line 15—15 of Fig. 1;

Fig. 16 is a vertical section taken on the line 16—16 of Fig. 2;

Fig. 17 is a transverse section through the head of the neck former showing the folding mechanism in full size detail;

Fig. 18 is a perspective view of the completed box; and

Figs. 19, 20, 21, and 22 are longitudinal sections through the neck former and the adjacent end of the discharge chute illustrating successive stages of operation.

As illustrated, the machine is shown as composed of a frame 11 supporting a table 12 upon which the various portions of the mechanism are mounted. Suitably journaled within the machine frame is a main drive shaft 13 driven by means of a pulley 14 and having mounted thereon a hand wheel 15 which also serves as a fly wheel, the drive pulley 14 being coupled and uncoupled from the drive shaft 13 by means of any suitable clutch mechanism, indicated at 16, and operable by means of the hand lever 17 and the treadle 18. The pinion 19 mounted upon the drive shaft 13 is in mesh with a larger pinion 20 fixed upon the counter shaft 21, likewise journaled in the frame in parallel relation to the main shaft 13; while a bevel pinion 22 carried by the main shaft 13 is in mesh with a bevel pinion $22^a$ fixed upon the cross shaft 23.

A card board supply spool 24 (Figs. 1 and 2) is mounted to rotate within bracket arms 25, 25 supported by the table 12, upon which spool the web 26 of card board is led between feed rolls 27 and 28 (Fig. 6) and by the latter fed beneath a scoring roll 29 provided at spaced intervals with three scoring ribs 30. These scoring ribs may have, as illustrated, a cutting edge for scoring by compression, or they may be provided with chisel like edges for scoring by cutting a groove in the paste board. The feed rolls 27, 28 are intermittently driven and to an equal degree (Fig. 5) by intermeshing spur wheels 31, 32 mounted upon the ends of the rolls, the latter being likewise provided with a ratchet wheel 33 engaged by a pawl 34 pivoted to a pawl arm 35 mounted on the roll axle and connected at 36 to a lever arm 37 bifurcated in its lower portion and taking over the shaft 21, the reciprocation of the lever 37 to actuate the feed rolls being effected by means of the engagement of a cam roll 38 carried by said lever within the cam groove 39 of the cam 40 mounted upon the counter shaft 21, it being readily understood that the feed rolls 27 and 28 will be intermittently driven to the extent of a certain fraction of a complete rotation upon each revolution of the cam 40. Upon the opposite end of the feed roll 28 is mounted a spur wheel 41 (Fig. 10) which is in mesh with a spur wheel 42 carried by the scoring roll 29 whereby the scoring roll is likewise intermittently driven simultaneously with the driving of the feed rolls but at a greater peripheral speed. In order to maintain a yielding frictional pressure upon the web 26 of card board the upper feed roll 27 is subjected to the action of a compression spring 43 bearing upwardly upon the top plate 44 of the housing for said rolls. It will be observed that the feed rolls 27 and 28 and likewise the scoring roll 29 are mounted at a slight inclination to the horizontal so that the web 26 as it is fed between the feed rolls and beneath the scoring roll also travels in a plane inclined to the horizontal for a reason hereafter to be explained.

Immediately in front of the scoring roll 29 is mounted a cutting mechanism in the form of shears (Figs. 5, 6, 10) comprising a yoke shaped head 45 suitably guided against angular movement and attached to a plunger rod 46 which is guided within the upper and lower portions 47 and 48 respectively of the yoke, a collar 49 being pinned at 50 upon the plunger rod and a coil spring 51 being disposed about the rod below the collar, said spring bearing above upon the collar and below upon the lower member 48 of the yoke. A cap piece 52 suitably secured to the member 47 of the yoke overlies the upper end of the plunger rod 46. The lower end of the plunger rod is bifurcated and takes over the counter shaft 21 whereby lateral movement of the rod is prevented, a vertical reciprocatory movement being imparted thereto by the engagement of a cam roll 53 carried by said rod and traveling within a cam groove 54 of the cam 55 fixed upon the shaft 21. Upon the head 45 and moving therewith is fixed a reciprocatory blade 56 the lower face of which is substantially flush with the lower face of the head and presenting a cutting edge coacting with the stationary blade 57. The lower face and edge of the reciprocatory blade 56 is substantially horizontal viewed longitudinally of said web, whereas the upper face and cutting edge of the stationary blade 57 is inclined to the horizontal to correspond to the inclination of the feed rolls, the scoring roll, and the web, whereby the web fed to said shears is subjected to a drawing cut, as will be readily understood. The movable blade of the shears being actuated in timed relation to and immediately following the actuation of the feed rolls the web of cardboard will have severed therefrom a strip corresponding in width to the amount of travel of the web through the rolls, the severed strip 58 dropping therefrom, as indicated in Fig. 6, to a position within the channel 59 below and in front of the knives.

Between the standards 60 supported by the bracket 61 is mounted a tape supply spool 62 from which the finishing strip in the form of a tape 63 is led over the glue roll 64, rotatably journaled in the standards 65 so as to rotate within a bath 66 of glue, which is advantageously heated in any approved manner, as for instance by a gas jet located thereunder. From the glue roll the tape is led beneath a friction guide roll 67 and around a second guide roll 68 and thence to the channel 59 beneath and in front of the shears so that the card board strip 58 drops thereon as it is severed from the web, the adhesive-coated face of the tape being uppermost as it lies within the channel and coming in contact with the strip of cardboard which falls thereon.

It will be noted (Fig. 6), as previously stated, that the lower face of the head 45 adjacent the knife 56 and also the lower face of the said knife present a substantially plane surface and these parts constitute in effect a movable die member between which and the bottom of the channel 59, as a stationary die member, the severed card board strip is compressed upon the underlying paper strip as the head 45 reaches the lower limit of its stroke whereby the foundation or body card board strip and the finishing paper strip are firmly united.

Upon one end of the axle 69 of the glue roll 64 is mounted a grooved pulley 70 traversed by a crossed belt 71 which likewise traverses a grooved pulley 72 loosely mounted upon the shaft 73 which is suitably journaled in the machine frame. Upon the shaft 73 is fixed a toothed pinion 74 (Fig.

16) which is in mesh with a toothed rack 75 formed upon the lower edge of a carrier 76 provided upon its upper edge with a shoulder 77. The carrier 76 is mounted for horizontal reciprocating movement in a slot beneath the channel 59 (Fig. 6) immediately in front of the stationary knife 57 and below the rear edge of the strip 58 with the end of which the shoulder or lug 77 is adapted to engage (Fig. 16) as the carrier advances.

The shaft 73 is alternately rotated in opposite directions by means of a pinion 78 (Fig. 14) fixed thereon and in mesh with a toothed sector 79 carried by the lever 80 pivoted at 81 and actuated by means of a cam roll 82 carried thereby and traveling within a cam groove 83 of the cam 84 fixed upon the cross shaft 23. This rotation of the shaft 73ª in opposite directions alternately serves, by means of the pinion 74, as will be obvious, to reciprocate the carrier 76 to and fro within the recess 59 whereby it will be understood that the tape 63 by reason of its attachment to the card board strip 58, is advanced with the said card board strip intermittently causing the same to be drawn at intervals over the glue roll 64, its intermittent travel corresponding in time and substantially in distance to the forward travel of the carrier.

Because of the frail nature of the tape 63 when moistened with the glue, and also in order to insure a uniform distribution of the adhesive upon the tape, I provide for the driving of the glue roll in synchronism with the advance movement of the carrier and at a peripheral speed corresponding substantially to that of the movement of the tape, but advantageously, at a very slightly slower speed in order to compensate for the stretching of the moist tape. To provide for the intermittent rotation of the glue roll in a forward direction timed to correspond to the forward movement of the carrier and permitting the glue roll to remain stationary during the return movement of the carrier a ratchet wheel 85 (Figs. 1 and 14) is fixed upon the shaft 73 contiguous to the grooved pulley 72 and a pawl 86 pivoted to the face of the pulley 72 at 87 is held in yielding engagement with the ratchet 85 by means of a spring 88 whereby upon the movement of the sector 79 in one direction the pulley 72 is caused to partake of the rotation imparted to the ratchet 85 and upon the movement of the sector in the opposite direction the pawl 86 rides over the teeth of the ratchet and the pulley 72 remains stationary.

As the card board strip or body blank is advanced by the carrier from its position beneath the shears taking with it the tape to which it is fixed it comes to rest substantially in the position shown in Fig. 16. It is desired to sever this tape portion upon a diagonal line so as to leave a paper tab projecting from the rear end of the strip. To accomplish this purpose a revolving blade 89 is arranged to coöperate with the forward end 90 of the bottom of the channel 59 (Figs. 1, 2, 10 and 15). The blade 89 is removably fixed within a disk 91 of a shaft 92, journaled within the bearings 93 and carrying a bevel gear 94 in mesh with a similar gear 95 carried by the vertical shaft 96 suitably journaled in the machine frame and having fixed upon its lower end a bevel gear 97 in mesh with a similar gear 98 fixed upon the counter shaft 21. The revolution of the blade 89 being timed to correspond to the reciprocation of the carrier, the paper strip is severed after the duplex strip composed of a foundation strip of card board and a finishing strip of paper is released by the shoulder of the carrier and during the return stroke of the carrier, any retrograde movement of the strip of tape being prevented by the dog 99 pivoted at 100, and bearing frictionally at an incline upon the tape as it rests within the channel.

The carrier having returned to its rearmost position, the shears are actuated to sever another strip of cardboard. As the card board strip drops upon the tape within the channel beneath the shears it will be seen from an inspection of Fig. 6 that the two are not in register vertically, the rear longitudinal edge of the card board strip extending beyond the rear or corresponding edge of the finishing strip and the front edge of the latter extending beyond the front edge of the former, these positions being assured by the gage plate 59ª. This provides for the shoulder or lug of the carrier engaging the end of the card board strip at one side of the paper strip and also leaves a projecting edge of the paper strip to be hemmed or folded over the front edge of the card board strip and back on to the upper face of the same as a binding. This folding of the finishing strip over the edge of the foundation strip is effected during the passage of the duplex strip through a longitudinally channeled hemming member 101, the front wall 102 of which is curved upwardly and to the rear upon a progressive spiral (Figs. 9, 15 and 16) somewhat similar to the hemmer of a sewing machine, whereby as the strip passes through the same the projecting edge of the finishing strip is progressively turned upward and then to the rear and downward upon the upper face of the foundation strip to which it is caused to adhere by the adhesive applied by the roll 64, the two strips being pressed into intimate contact by the overhanging member 101ª, said member pressing downward thereon. The lower wall of the hemming device 101 is cut away to provide a longitudinal slot 103 in alinement with the path of the carrier 76 so that during the passage of the duplex strip through the hemming device the rear margin of the foundation strip, which is not covered by the finishing strip, overhangs said slot.

A second bath 104 of adhesive and preferably a paste, is located beneath the hemming device, and within such bath is mounted to rotate (Fig. 8) a paste roll 105 upon a shaft 106, said shaft 106 being detachably coupled to a driven shaft 107 by means of coacting ratchet faces formed upon the two disks 108, 109. The shaft 107 is driven by means of a sprocket wheel 110 through a sprocket chain 111 from a sprocket 112 fixed upon the counter shaft 23. The paste bath 104 is held in place with its driven disk 108 in engagement with the driving disk 109 by means of a set screw 113 threaded in the bracket arm 114 and engaging the concave upper face of a standard 115 which may be formed integral with the paste bath. Upon the loosening of the screw 113 the bath can be readily removed from beneath the bracket arm and its shaft 106 uncoupled from the shaft 107.

Near one edge of the paste bath is pivoted a rock shaft 116 (Figs. 14 and 15) provided with a laterally extending bifurcated plate 117 which embraces the paste roll 105, the edges of the plate lying sufficiently close to the side faces of the roll to remove the adhesive which would otherwise be carried upward during the rotation of the roll, while the web of the plate is held at a greater or less distance from the edge face of the roll by the degree to which the shaft 116 is rocked, such adjustment of the plate with reference to the paste roll being obtained by providing the front end of the shaft with an arm 118 which is in threaded engagement with a set screw 119 swiveled in a suitable support 120. By the adjustment of the set screw 119 it is possible to regulate the amount of paste which is carried up from the bath upon the edge face of the paste roll and by it transferred (Figs. 8 and 16) to the under marginal portion of the foundation strip 58 during the passage of the duplex strip through the hemming device.

After the severing of the tape by the revolving blade 89, the duplex strip is further advanced by the engagement of the forward end of the same with a cam or mutilated feed roll 121 (Figs. 11, 14 and 16) mounted upon a shaft 122 journaled within the blocks 123, 123, which are yieldingly held by the compression springs 124, 124. Arranged immediately below the cam feed roll 121 is a friction feed roll 125 carried by the shaft 126 fixedly journaled in the uprights 127, 127, which likewise serve as journal supports for the bearing blocks 123, 123 of the shaft 122. Upon the front ends of the shafts 122 and 126 are mounted respectively intermeshing pinions 128 and 129, and upon the shaft 126 is mounted a sprocket 130 by means of which the two shafts are driven through the sprocket chain 131 from a sprocket 132 carried by the cross shaft 23. It will be seen that the forward end of the duplex strip rests stationary upon the friction roll 125 during the time that the cut away portion of the cam 121 passes thereover and that as soon as the cam portion 121$^a$ reaches a position opposite the roll 125 the end of the duplex strip is gripped between the two rolls 121 and 125 and is fed forward thereby, being at the same time compressed so as to insure intimate contact of the overlapping portions of the finishing and foundation strips. The extent of the cam face 121$^a$ is sufficient to cause the same to feed the duplex strip forward a distance corresponding to the travel of the carrier so that as another strip is advanced to the position shown in Fig. 16 the hemmed and pasted strip is advanced a corresponding distance and deposited within the shifter 133 with its forward end resting upon the ledge 134 upon the upper end of a standard 135.

The shifter 133 is carried by a reciprocating shaft 136 guided for horizontal movement and actuated by means of a lever 137 pinned at 138 to the shaft 136, the said lever 137 fulcrumed at 139 and actuated by the engagement of a roll 140 carried by its lower end and engaging within a cam groove formed in the cam 141 whereby the shifter is moved from a position in line with the paste roll 105 to transfer the duplex strip rearwardly to bring the same into proper position for folding and to make room for the next succeeding strip, the transferred strip in its new position being supported upon the tips 142 and 143 of a plunger head 144 and also upon a stud 145 in the plane of movement of folding arms, the operation of which will be later described.

The plunger head 144 is carried by the upper end of a plunger rod 146 having an offset bifurcated lower end 147 which takes over the shaft 21, the plunger being given a periodical vertical reciprocating movement by the engagement of a roll 148 within the cam groove of the cam 149 (Figs. 12, 14 and 16). It will be observed that the head 144 is provided in its upper face with a recess between the tips 142 and 143 which recess is bridged by the duplex strip after its rearward transference by the shifter 133.

Below the plunger head 144 at 150 is pivoted a folding arm 151 carrying at its upper end a finger 152 having its inner face at 153 formed as a right angle, the movement of the arm 151 about its pivot causing the finger 152 to travel in an arc to bring the concave angular face 153 into engagement over the upper corner of the neck form 154 which will hereafter be described in detail. The motion is transmitted to the arm 151 by means of an arm 155 fixed with relation thereto and pivoted at 156 to a rod 157 bifurcated at its lower end and taking over the shaft 23, the rod 157 being reciprocated by reason of the engagement of the cam roll 158 within the groove 159 of a cam 160 mounted upon said shaft 23.

Upon the opposite side of the plunger rod 146 is pivoted at 161 an angle lever 162 carrying at its lower end the roll 163 which engages within the cam groove 164 of a cam 165. The upper arm of the angle lever 162 has pivoted thereto at 166 a finger 167 under tension of a spring 168 which pulls the finger forward, a stop 169 being provided to limit said movement. At the upper extremity of the angle lever 162 is pivoted at 170 a second finger 171 extending transversely of said arm and having its tip downwardly pressed under the action of the spring 172 such downward movement being limited by the stud 173. The movemnt of the angle lever 162 about its pivot 161 is such as to bring the tip of the finger 167 against the side of the neck former or form 154 and the tip of the finger 171 into engagement with the upper side of the said folder, the two fingers bearing upon the folder at the two sides of the corner opposite that corner engaged within the angle of the finger 152.

Another arm 174 is pivoted at 175 upon one of the uprights 127 and carries a friction roll 176, the free end of the arm being angularly offset at 177 and terminating in a downwardly turned tip 178. A cam 179 is fixed upon the shaft 122 and engages with its cam face the roll 176 to periodically elevate and lower the arm 174, the latter being held in yielding engagement with the cam by means of a suitably anchored spring 180. The movement of the arm 174 about its pivot 175 is such as to cause the tip 178 to contact with the upper side of the folder 154 immediately before and at the same place as the tip of the finger 171, such contact being but momentary and the finger 178 being removed in time to escape the finger 171.

The several parts of the machine just described constitute the folding mechanism whereby the duplex strip is folded about the neck form and the ends secured together. It is to be noted that the recess in the plunger head 144 has a longitudinal extent corresponding to the length of the form 154, that wall of the recess formed by the tip 142 being substantially in alinement with one end face of the form 154, while that end wall of the recess formed by the tip 143 extends obliquely outward from a point substantially in alinement with the other end face of the form. The length of the duplex strip corresponds to the total length of the four faces of the form and as it rests upon the tips 142 and 143 it is so positioned that it extends, as indicated in dotted lines in Fig. 17, to the left beyond the left wall of the recess a distance corresponding to the height of the left end face of the form and it projects to the right beyond the face of the form a distance corresponding to the height of the right end face and to the length of the top face so that when folded about the form the two ends of the strip will meet at the upper left hand corner of the form.

The operation of folding is performed in the following manner: As the plunger head 144 is elevated, the strip resting thereon is forced by contact with the lower side of the form into the recess of the head and the two ends of the strip are thereby folded upwardly against the two lateral sides of the form. Simultaneously with the upward movement of the plunger head the rod 157 and the angle lever 162 are actuated to cause the rigid finger 152, and the spring pressed finger 167 to follow the ends of the strip, the finger 167 pressing the left hand end of the strip yieldingly against the left side of the form and the angular inner face 153 of the finger 152 folding the longer right hand end around the corner of the form so as to cause the same to overlie the upper side of the form (Fig. 17). Immediately after the folding over of the strip upon the top of the form the arm 174 is actuated and its finger 178 is brought down upon the end of the strip holding the same in intimate contact with the top of the form while the tip of the finger 171, which is beveled upon its lower corner, is slipped over the end of the strip, the finger tip 178 then moving quickly out of the way to permit the tip of the finger 171 to take its place yieldingly pressing the end of the strip down and the free obliquely cut end of the finishing strip into intimate contact so as to unite the two ends of the strip at the upper left hand corner of the form to complete the neck upon the form as a mandrel.

The neck former or form comprises the head 154, shown in the present case as being rectangular, and which is carried by a tubular sleeve 181 slidable within the bearings 182, 183 upon a stationary rod 184 having a coned or wedge shaped end 185. The sleeve 181, and with it the former head, is reciprocated by means of a lever 186 fulcrumed at 187, said lever being coupled to the sleeve by a rocking pin 188, adjustment being provided by the set screw 189, while the lower end of the lever is provided with a cam roll 190 which engages within the cam groove 191 of the cam 192. In the face of the former head are mounted for radial diagonal movement four jaws 193, each of which is pressed inwardly toward the longitudinal axis of the form by a compression spring 194 which spring is seated within a recess 196 formed between offset shoulder portions 197 and 198 of the jaw and head respectively and bears inwardly upon the shoulder 197 of the jaw and outwardly upon a shoulder 198 of the head. The movement of each jaw is limited by a pin 199 fixed in the form and engaging within a slot 200 of the jaw. The inner adjacent ends of the jaws are concave, being formed as the segments of a circle about the axis of the rod 184. The inner ends of the jaws bear against the coned end 185 of the rod 184 and are adapted to be wedged outwardly by a relative axial movement of the rod and jaws to a position in which each jaw extends slightly beyond the two adjacent lateral faces of the form, as indicated in dotted lines in Fig. 17. The rod 184 being stationary such relative movement is imparted by the reciprocation of the sleeve 181, previously described. The jaws operate in a vertical plane and immediately in advance of the neck formed by the folding of the duplex strip about the form (Fig. 19) and have as their function the spreading of the box walls preparatory to the insertion therein of the neck.

Upstanding from the table 12 immediately in front of the form is a box magazine 201 providing a substantially vertical chute 202 down which the boxes slide by gravity while confined within the chute by the flanges 204 which overlie the open front of the box. The discharge trough 205 extends horizontally substantially in line with the form and at substantially right angles to the box magazine, the feed chute 202 of the magazine and the discharge chute intersecting at a point immediately in front of the form. A pair of spring arms 206, 206 are pivoted to a cross bar 207 beneath a discharge chute 205 and are connected by a spring 208 tending to draw the two arms together. The forward free end portions 209 are curved inwardly toward each other and rest within slots 210, 210 in the side walls of the discharge chute, the extreme ends of the arms projecting beyond the walls into the chute at points below the box feed chute 202 and immediately to the rear of the lowermost box therein. Upon the outer side walls of the discharge chute 205 are fixed cam blocks 211 having inclined faces 212 adapted to engage studs 213 carried by the arms 206 causing the arms to separate against the tension of the spring 208 as the said spring arms 206 are moved to the rear. This movement of the arms is effected by a T-lever one end of the head 214 of which is connected to the cross bar 207 while the other end of the same is pivoted at 215 to the machine frame, the stem 216 of the lever carrying a roll 217 which travels over the periphery of the cam 192, the said roll being held in yielding contact with the cam by the contractile spring 218 connected to the head of the lever and suitably anchored at 219.

A pair of dogs 220, 220 are pivoted at 221, 221 in the side wall of the discharge chute, (Figs. 19, 22.) The head of each dog is pressed inwardly by a spring 222 bearing in one direction against the back of the dog and in the other against the inner face of a plate 223 secured to the chute wall by screws 224, the inward tilting movement of the dog being limited by the engagement of its tail 225 within a recess of the chute wall. The head of each dog is provided with a forwardly facing inwardly turned lip 226, the function of which will be later described.

The neck having been formed upon the head of the form and a box body having descended through the box feed chute to the position indicated in Fig. 19 immediately in front of the form, the box is moved toward the form by the inturned ends of the spring arms 209 engaging behind the box and pushing it forward to the position shown in Fig. 20, centering the same within the beveled margins of the chute. The form is then advanced by the reciprocation of the sleeve 181, and the jaws 193 entering the box spread the walls of the same outwardly (Fig. 20). As the form advances the neck follows the jaws into the box until the jaws reach the bottom of the box (Fig. 21). During the latter portion of this movement the inner adjacent ends of the jaws 193 riding down the inclined face of the coned end of the rod 185 are retracted by their springs 194 so that they no longer project to the same extent, their spreading function having been completed when the neck entered the box. Up to this time the inturned ends of the spring arms 209 engage behind the bottom of the box and serve as abutments to hold the same while the form head with the neck enter the same. Hereupon the spring arms are withdrawn by the engagement of the studs 213 with the cam faces 212 of the blocks 211 and as the head advances farther (Fig. 22) the box is itself advanced by the pressure on the bottom of the same of the flat faces of the jaw, which latter are still further retracted radially by the removal of their inner ends from contact with the coned rod. Upon the further movement of the head the lips 226 of the dogs engage over the opposite edges of the neck and hold the same as the form moves backward to its original position permitting another box to drop into position while a new strip is folded about the form, the position of the parts being that shown in Fig. 19. As another neck is inserted in another box and such other box advanced in the manner just described, the bottom of the same comes into contact with the neck of the preceding box which, (Fig. 21) is not completely seated within the box, the incoming box contacts with the partially seated neck and pushes the same to the bottom of the box to its final position (Fig. 22).

At the outer end of the discharge chute, we provide a standard 227 to which is pivoted at 228 one end of an iron weight in the form of a bar 229, the free end of which is beveled at 230, as indicated. This weight has pivoted thereto at 231 a hook 232 and the standard 227 is provided with a pin 233. Normally the weight 229 lies longitudinally of the discharge chute upon the upper edges of the boxes within said chute, the boxes being pushed toward the discharge end of the chute beneath the weight which frictionally retards their progress and at the same time bears downwardly so as to slightly concave the boxes and hold the walls of the same in more intimate contact with the freshly inserted necks. When it is desired to obtain access to the boxes within the chute beneath the weight or for any other reason to throw the weight out of operation, it is swung upwardly upon its pivot 228, the hook 232 engaging the pin 233 and supporting the same in its elevated position as indicated.

Summarizing the operation of the machine, it will be observed that the feed of the web of card board or body material to the shears and the severing of the same is timed to the feed of the paper tape over the glue roll and into the channel beneath the shears so that the strip or blank of card board when severed from the web falls upon the coated upper face of the paper strip and is pressed thereon by the continued downward movement of the die on the lower face of the shears. The actuation of the carrier also is gaged in time and extent to advance the composite or duplex strip from its position beneath the shears to a position where it is severed from the following strip and the overlapping edge of the finishing strip is hemmed or folded over the edge of the foundation strip while the unfinished lower marginal face of the foundation strip has applied thereto a coating of adhesive. The strip is then advanced a corresponding distance and shifted laterally into the grasp of the folding arms by which it is folded around the four sides of the form and the free end portions of the finishing strip pasted down to join the ends of the composite strip to form a neck. The form then advances the neck into a box the walls of which have been spread by the jaws while the spring arms hold the box in position, the spring arms being then retracted and the neck stripped from the form by means of the dogs, the same operations being performed in order upon lengths of foundation cardboard and finishing tape fed in succession, each box serving to press home to the bottom of the preceding box the neck deposited therein by the form, and the boxes 300 being then progressively pushed through the discharge chute and subjected to the frictional retardation of the weight-bar and a downward pressure of the same to maintain more intimate contact of the neck and box. It will thus be observed that all the steps from the making from the webs of card board and finishing paper, including the folding of the same, the feeding of the boxes, the inserting of the necks within the boxes and the discharge of the finished boxes from the machine, are entirely automatic, the machine requiring no attention other than to see that the supply of paper, card board and boxes is unbroken, and that the baths are kept supplied with glue, paste or other suitable adhesive.

We claim:

1. In a machine of the character described, the combination of a supply-roll of body-material, a supply-roll of finish-material, means to apply adhesive to one of said materials, means to feed the advance portion of said body-material unsevered from its supply-roll at right-angles to the direction of travel of the finish-material into superposed relation with and spaced away from the advance unsevered portion of said finish-material, means to sever a body-blank from its supply, means to press such severed blank into adhered relation with said underlying portion of finish-material, blank-feeding means adapted to engage the rear end of said body-blank and advance both the body-blank and the finish-material in a direction at right-angles to the feed of the unsevered body-material bringing a succeeding portion of the finish-material into position for receiving the next body-blank, and means to sever the finish-material to the rear of such advanced duplex-blank, substantially as described.

2. In a machine of the character described, the combination of a supply-roll of body-material, a supply-roll of finish-material, means to apply adhesive to one of said materials, means to feed the advance portion of said body-material unsevered from its supply-roll at right-angles to the direction of travel of the finish-material into superposed relation with and spaced away from the advance unsevered portion of said finish-material, means to sever a body-blank from its supply, means to press such severed blank into adhered relation with said underlying portion of finish-material. blank-feeding means adapted to engage the rear end of said body-blank and advance both the body blank and the finish-material in a direction at right-angles to the feed of the unsevered body-material bringing a succeeding portion of the finish-material into position for receiving the next body-blank, and means to sever the finish-material on a diagonal line to the rear of such advanced duplex-blank, substantially as described.

3. In a machine of the character described, the combination of a supply-roll of body-material, a supply-roll of finish-material, means to apply adhesive to one of said materials, means to feed the advance portion of said body-material unsevered from said supply-roll at right-angles to the direction of travel of the finish-material into superposed relation with and spaced away from the advanced unsevered portion of said finish-material, means to sever a body-blank from its supply, means to press such severed blank into adhered relation with said underlying portion of finish-material, blank-feeding means having a right-line reciprocating movement only adapted to engage the rear-end of said body-blank and advance both the body-blank and the finish-material in a direction at right-angles to the feed of the unsevered body-material bringing a succeeding portion of the finish-material into position for receiving the next body-blank, and means to sever the finish-material to the rear of such advanced duplex-blank, substantially as described.

4. In a machine of the character described, the combination of a supply-roll of body-material, a supply-roll of finish-material, means to apply adhesive to one of said materials, means to feed the advance portion of said body-material unsevered from its supply-roll at right angles to the direction of travel of the finish-material into superposed relation with and spaced away from the advance unsevered portion of said finish-material, means to sever a body-blank from its supply on a line outside of the corresponding edge of the finish-material, means to press such severed blank into adhered relation with and extending beyond the longitudinal edge of said underlying portion of finish-material, blank-feeding means adapted to engage the rear end of said body-blank at one side of said adhering finish-material and advance both the body-blank and the finish-material in a direction at right-angles to the feed of the unsevered body-material bringing a succeeding portion of the finish-material into position for receiving the next body-blank, and means to sever the finish-material to the rear of such advanced duplex-blank, substantially as described.

5. In a machine of the character described, the combination of a supply-roll of body-material, a supply-roll of finish-material, means to apply adhesive to one of said materials, means to feed the advance portion of said body-material unsevered from its supply-roll at right-angles to the direction of travel of the finish-material into superposed relation with and spaced away from the advance unsevered portion of said finish-material, means to sever a body-blank from its supply on a line outside of the corresponding edge of the finish-material, means to press such severed blank into adhered relation with and extending beyond the longitudinal edge of said underlying portion of finish-material, blank-feeding means adapted to engage the rear-end of said body-blank at one side of said adhering finish-material and advance both the body-blank and the finish-material in a direction at right-angles to the feed of the unsevered body-material bringing a succeeding portion of the finish-material into position for receiving the next body-blank, and means to sever the finish-material on a diagonal line to the rear of such advanced duplex-blank, substantially as described.

6. In a machine of the character described, the combination of a supply-roll of body-material, a supply-roll of finish-material, means to apply adhesive to one of said materials, means to feed the advance portion of said body-material unsevered from its supply-roll at right-angles to the direction of travel of the finish-material into superposed relation and spaced away from the advance unsevered portion of said finish-material, means to sever a body-blank from its supply on a line outside of the corresponding edge of the finish-material, means to press such severed blank into adhered relation with and extending beyond the longitudinal edge of said underlying portion of finish-material, blank-feeding means having a right-line reciprocating movement only adapted to engage the rear end of said body-blank at one side of said adhering finish-material and advance both the body-blank and the finish-material in a direction at right-angles to the feed of the unsevered body-material bringing a succeeding portion of the finish-material into position for receiving the next body-blank, and means to sever the finish-material to the rear of such advanced duplex-blank, substantially as described.

7. In a box-necking machine, the combination of a continuous supply strip of body-material, a continuous supply strip of finishing-material, a receiving member for the advance portion of said finishing strip, means to feed said body-strip, means to sever a blank from said body-strip and guide it on to the finishing strip on said member, means to apply adhesive to one of said materials, means to press said body-blank and finishing strip together on said member, means to feed said duplex element thereby bringing a new portion of said finishing-material on said member, means to fold an edge of said finishing-material over an edge of said severed body-blank, means to sever said flat duplex-blank from said finishing-material supply strip, means to apply adhesive to said flat duplex blank, a form, means coöperating with said form to produce a neck thereon from said flat duplex blank, and means to insert said neck in a box-tray, the adhesive applied to the flat duplex blank causing said neck and box-tray to adhere to one another, substantially as described.

8. In combination, shearing and pressing mechanism comprising a stationary plate, a reciprocatory plate having a cutting edge and a die face, a co-acting receiving die member arranged in the rear of the stationary plate and below and in the path of the reciprocating die member, means to feed a narrow strip of material lengthwise of and on to the receiving-die, means to feed a web of material to the shearing mechanism, and means to actuate the shearing and pressing mechanism whereby a strip is severed from the web and pressed down into intimate contact with the strip of material on the receiving-die, substantially as described.

9. In combination, shearing and pressing mechanism comprising a stationary plate, a reciprocatory plate having a cutting-edge and a die-face, a co-acting receiving die member arranged in the rear of the stationary plate and below and in the path of the reciprocating member, means to feed a narrow strip of material having its upper face coated with an adhesive lengthwise of and on to the receiving-die, means to feed a web of foundation material to the shearing-mechanism, and means to actuate the shearing and pressing mechanism to sever a strip of foundation material and press the same upon and in intimate contact with the adhesive-coated face of the strip to form a duplex strip, substantially as described.

10. In combination, shearing and pressing mechanism comprising a stationary blade, a reciprocatory blade having a cutting edge and a die face, a coacting receiving die member arranged in the rear of the stationary blade and in the path of the reciprocating die member, means to feed on to the receiving die a strip of finishing material having its upper face coated with adhesive, means to feed a web of foundation material to the shearing mechanism, means to actuate the shearing and pressing mechanism to sever a strip of foundation material and to compress the same upon and in intimate contact with the finishing strip to form a duplex strip, means to fold the duplex strip and join the ends to form a neck, and means to insert and secure the neck within a box, substantially as described.

11. In combination, shearing and pressing mechanism comprising a stationary blade, a reciprocatory blade having a cutting edge and a die face, a coacting receiving die member arranged in the rear of the stationary blade and in the path of the reciprocating die member, means to feed on to the receiving die a strip of finishing material having its upper face coated with adhesive, means to feed a web of foundation material to the shearing mechanism, means to actuate the shearing and pressing mechanism to sever a strip of foundation material and to compress the same upon and in intimate contact with the finishing strip to form a duplex strip, means to fold an edge of the finishing strip over an edge of the foundation strip, means to apply adhesive to one face of the duplex strip, means to fold the duplex strip and join the ends to form a neck exteriorly coated with adhesive, and means to insert the neck within a box, substantially as described.

12. In a folding mechanism, the combination of a form, a carrier for the material to be folded, means to approach the carrier and material against one side of the form, an arm having a terminal finger presenting an inner face corresponding to the exterior of the form and arranged to engage and fold an end of the material against a side of the form, a second arm having a finger arranged to press the other end of the material against another side of the form, a third finger arranged to engage and press an end of the material upon the remaining side of the form, and means to secure together the adjacent ends of the folded material to form a neck, substantially as described.

13. In a folding mechanism, the combination of a form, a carrier for the material to be folded, means to approach the carrier and material against the bottom of the form, a pivoted arm having a rigid terminal finger with an angular inner face corresponding to the exterior of the form at an upper corner and arranged to engage and fold an end of the material against one end of the form and around the upper corner of the same on to the top of the form, a second arm having a spring pressed finger arranged to press the other end of the material against the other end of the form, a third arm arranged to hold the end of the material against the top of the form, and a fourth finger arranged to press together the adjacent ends of the material to form a neck, substantially as described.

14. In a folding mechanism, the combination of a form, a carrier for the material to be folded, means to approach the carrier and material against the bottom of the form, a pivoted arm having a rigid terminal finger with an angular inner face corresponding to the exterior of the form at an upper corner and arranged to engage and fold an end of the material against one end of the form and around the upper corner of the same on to the top of the form, a second pivoted arm carrying a pivoted spring pressed finger arranged to press the other end of the material against the other end of the form, said second arm also having a spring pressed pivoted finger arranged to engage over the top of the form and press together the adjacent ends of the folded material to form a neck, substantially as described.

15. In a folding mechanism, the combination of a form, a carrier for the material to be folded, means to approach the carrier and material against the bottom of the form, a pivoted arm having a rigid terminal finger with an angular inner face corresponding to the exterior of the form at an upper corner and arranged to engage and fold an end of the material against one end of the form and around the upper corner of the same on the top of the form, a spring pressed arm having a finger arranged to move downwardly on to the top of the form to hold the end of the material closely against the form, another pivoted arm carrying a spring pressed pivoted finger arranged to press the other end of the material against the other end of the form and also carrying a spring pressed pivoted finger arranged to engage over the top of the form to press together the adjacent ends of the material to form a neck, substantially as described.

16. In a folding mechanism, the combination of a form, a carrier for the material to be folded, means to approach the carrier and material against the bottom of the form, a pivoted arm having a rigid terminal finger with an angular inner face corresponding to the exterior of the form at an upper corner and arranged to engage and fold an end of the material against one end of the form and around the upper corner of the same on to the top of the form, a spring pressed arm having a finger arranged to move downwardly on to the top of the form to hold the end of the material closely against the form, another pivoted arm carrying a spring pressed pivoted finger arranged to press the other end of the material against the other end of the form and also carrying a spring pressed pivoted finger arranged to engage over the top of the form to press together the adjacent ends of the material to form a neck, and cam driving means for operating the arms and fingers in proper timed relation, substantially as described.

17. In a folding mechanism, the combination of a form, a carrier having its face recessed to embrace the bottom of the form and adapted to support the material across said recess, means to approach the carrier toward the form to force the material into the recess and upturn the ends of the same about the two ends of the form, an arm having a terminal finger presenting an inner face corresponding to the exterior of the form and arranged to engage and fold an end of the material against a side of the form, a second arm having a finger arranged to press the other end of the material against another side of the form, a third finger arranged to engage and press an end of the material upon the remaining side of the form, and means to secure together the adjacent ends of the folded material to form a neck, substantially as described.

18. In a folding mechanism, the combination of a form, a carrier having its face recessed to embrace the bottom of the form and adapted to support the material across said recess, means to approach the carrier toward the form to force the material into the recess and upturn the ends of the same about the two ends of the form, a pivoted arm having a rigid terminal finger with an angular inner face corresponding to the exterior of the form at an upper corner and arranged to engage and fold an end of the material against one end of the form and around the upper corner of the same on to the top of the form, a second arm having a spring pressed finger arranged to press the other end of the material against the other end of the form, a third arm arranged to hold the end of the material against the top of the form, and a fourth finger arranged to press together the adjacent ends of the material to form a neck, substantially as described.

19. In a folding mechanism, the combination of a form, a carrier having its face recessed to embrace the bottom of the form and adapted to support the material across said recess, means to approach the carrier toward the form to force the material into the recess and upturn the ends of the same about the two ends of the form, a pivoted arm having a rigid terminal finger with an angular inner face corresponding to the exterior of the form at an upper corner and arranged to engage and fold an end of the material against one end of the form and around the upper corner of the same on to the top of the form, a second pivoted arm carrying a pivoted spring pressed finger arranged to press the other end of the material against the other end of the form, said second arm also having a spring pressed pivoted finger arranged to engage over the top of the form and press together the adjacent ends of the folded material to form a neck, substantially as described.

20. In a folding mechanism, the combination of a form, a carrier having its face recessed to embrace the bottom of the form and adapted to support the material across said recess, means to approach the carrier toward the form to force the material into the recess and upturn the ends of the same about the two ends of the form, a pivoted arm having a rigid terminal finger with an angular inner face corresponding to the exterior of the form at an upper corner and arranged to engage and fold an end of the material against one end of the form and around the upper corner of the same on to the top of the form, a spring pressed arm having a finger arranged to move downwardly on to the top of the form to hold the end of the material closely against the form, another pivoted arm carrying a spring pressed pivoted finger arranged to press the other end of the material against the other end of the form and also carrying a spring pressed pivoted finger arranged to engage over the top of the form to press together the adjacent ends of the material to form a neck, substantially as described.

21. In a folding mechanism, the combination of a form, a carrier having its face recessed to embrace the bottom of the form and adapted to support the material across said recess, means to approach the carrier toward the form to force the material into the recess and upturn the ends of the same about the two ends of the form, a pivoted arm having a rigid terminal finger with an angular inner face corresponding to the exterior of the form at an upper corner and arranged to engage and fold an end of the material against one end of the form and around the upper corner of the same on to the top of the form, a spring pressed arm having a finger arranged to move downwardly on to the top of the form to hold the end of the material closely against the form, another pivoted arm carrying a spring pressed pivoted finger arranged to press the other end of the material against the other end of the form and also carrying a spring pressed pivoted finger arranged to engage over the top of the form to press together the adjacent ends of the material to form a neck, and cam driving means for operating the arms and fingers in proper timed relation, substantially as described.

22. In a form, the combination of a head, jaws mounted in advance of the head and slidable radially thereof and having their inner ends disposed adjacent each other, yielding means tending to retract the jaws within a forward continuation of the periphery of the head, and a wedge member adapted to engage the adjacent ends of the jaws, the head and wedge member being relatively movable, substantially as described.

23. In a form, the combination of a head, jaws mounted in advance of the head and slidable radially thereof and having their inner ends disposed adjacent each other, spring means tending to retract the jaws within a forward continuation of the periphery of the head, and a wedge member disposed within the head and adapted to engage between the adjacent ends of the jaws, the head and wedge member being relatively movable axially of the latter, substantially as described.

24. In a form, the combination of a head adapted to support the formed article, jaws slidable radially thereof in advance of the article on the head and having their inner ends disposed adjacent each other and formed as the segments of a circle, spring means tending to retract the jaws within the periphery of the head, a wedge member disposed within the head and adapted to enter the circle formed by the adjacent ends of the jaws, and means to reciprocate the head axially of the wedge member, substantially as described.

25. In a form, the combination of a head, jaws mounted for movement radially of the head on the front face thereof and having their inner ends disposed adjacent each other and formed as the segments of a circle, spring means tending to retract the jaws within the periphery of the head, a stationary rod disposed within the head in axial alinement with the circle and having a coned end, and means to reciprocate the head to cause the coned end of the rod to enter the circle formed by the adjacent ends of the jaws and force the latter outwardly against the tension of the spring means, substantially as described.

26. In a box necking machine, the combination with angularly arranged chutes, one to feed boxes to the neck inserting mechanism and the other to discharge the finished boxes, of means arranged in line with the discharge chute to form box necks, means to spread the boxes, means to actuate the form to insert the neck in the expanded box, means to serve as an abutment for the box during the insertion of the neck, and means to remove the said abutment after the insertion of the neck to permit the entrance of the box into the discharge chute, substantially as described.

27. In a box necking machine, the combination with angularly arranged chutes, one to feed boxes to the neck inserting mechanism and the other to discharge the finished boxes, of means arranged in line with the discharge chute to form box necks, means to spread the box, means to actuate the form to insert the neck in the expanded box, and means to engage the neck to strip the same with the box from the form, substantially as described.

28. In a box necking machine, the combination with angularly arranged chutes, one to feed boxes to the neck inserting mechanism and the other to discharge the finished boxes, of means arranged in line with the discharge chute to form box necks, means to spread the box, means to actuate the form to partially insert the neck in the expanded box, means to engage the neck to prevent the removal of the same from the box upon the retraction of the form, a movable abutment for the box during the insertion of the neck, and means to remove the abutment after the insertion of the neck to permit the box as it enters the discharge chute to bear against and push home the partially inserted neck of the preceding box, substantially as described.

29. In a box necking machine, the combination of a receiving die, a tape supply spool, an adhesive bath, a roll dipping therein and traversed by the tape, means to lead the coated tape to the receiving die, a foundation material supply, means to sever a strip of foundation material and deposit the same upon the coated face of the tape on the receiving die, means to press the strip and the tape to form a duplex strip, means to advance the duplex strip and with it the attached tape to feed additional tape on to the receiving die, means to sever the duplex strip from the tape, means to fold an edge of the tape over the edge of the foundation strip, said means comprising a member providing an interior longitudinal passage having one wall arranged upon a spiral to engage and deflect the edge of the tape around the edge of the strip and down upon the opposite face thereof, means to apply adhesive to the lower face of the duplex strip, means to fold the strip and join the adjacent ends to form a neck, and means to insert the neck within a box, substantially as described.

30. In a box necking machine, the combination of a receiving die, a tape supply spool, and adhesive bath, a roll dipping therein and traversed by the tape, means to lead the coated tape to the receiving die, a foundation material supply, means to sever a strip of foundation material and deposit the same upon the coated face of the tape on the receiving die, means to press the strip and the tape to form a duplex strip, means to advance the duplex strip and with it the attached tape to feed additional tape on to the receiving die, means to sever the duplex strip from the tape, means to fold an edge of the tape over the edge of the foundation strip, said means comprising a member providing an interior longitudinal passage having one wall arranged upon a spiral to engage and deflect the edge of the tape around the edge of the strip and down upon the opposite face thereof, means to apply adhesive to the lower face of the duplex strip, said means comprising an adhesive bath, a narrow roll dipping therein, means to drive the roll to bring the edge thereof in contact with the strip, a bifurcated scraper arranged to embrace the roll, and means to adjust the scraper toward and from the edge of the roll to scrape the adhesive therefrom in varying degree, means to fold the pasted duplex strip and join the adjacent ends to form a neck, and means to insert the neck within a box, substantially as described.

31. In a box necking machine, the combination of a receiving die, means to feed a strip of adhesive-coated finishing material on to the die, means to feed a strip of foundation material upon the coated side of the finishing strip while on the die, means to press the two strips together to form a duplex strip, means to fold the duplex strip comprising a form, a carrier for the material to be folded, means to approach the carrier and material against one side of the form, an arm having a terminal finger presenting an inner face corresponding to the exterior of the form and arranged to engage and fold an end of the material against a side of the form, a second arm having a finger arranged to press the other end of the material against another side of the form, a third finger arranged to engage and press an end of the material upon the remaining side of the form, and means to secure together the adjacent ends of the folded material to form a neck, substantially as described.

32. In a box necking machine, the combination of a receiving die, means to feed a strip of adhesive-coated finishing material on to the die, means to feed a strip of foundation material upon the coated side of the finishing strip while on the die, means to press the two strips together to form a duplex strip, means to fold the duplex strip comprising a form, a carrier for the material to be folded, means to approach the carrier and material against the bottom of the form, a pivoted arm having a rigid terminal finger with an angular inner face corresponding to the exterior of the form at an upper corner and arranged to engage and fold an end of the material against one end of the form and around the upper corner of the same on to the top of the form, a spring pressed arm having a finger arranged to move downwardly on to the top of the form to hold the end of the material closely against the form, another pivoted arm carrying a spring pressed pivoted finger arranged to press the other end of the material against the other end of the form and also carrying a spring pressed pivoted finger arranged to engage over the top of the form to press together the adjacent ends of the material to form a neck, substantially as described.

33. In a box necking machine, the combination of a receiving die, means to feed a strip of adhesive-coated finishing material on to the die, means to feed a strip of foundation material upon the coated side of the finishing strip while on the die, means to press the two strips together to form a duplex strip, means to fold the duplex strip comprising a form, a carrier having its face recessed to embrace the bottom of the form and adapted to support the material across said recess, means to approach the carrier toward the form to force the material into the recess and upturn the ends of the same about the two ends of the form, an arm having a terminal finger presenting an inner face corresponding to the exterior of the form and arranged to engage and fold an end of the material against a side of the form, a second arm having a finger arranged to press the other end of the material against another side of the form, a third finger arranged to engage and press an end of the material upon the remaining side of the form, and means to secure together the adjacent ends of the folded material to form a neck, substantially as described.

34. In a box necking machine, the combination of a receiving die, means to feed a strip of adhesive-coated finishing material on to the die, means to feed a strip of foundation material upon the coated side of the finishing strip while on the die, means to press the two strips together to form a duplex strip, means to fold the duplex strip comprising a form, a carrier having its face recessed to embrace the bottom of the form and adapted to support the material across said recess, means to approach the carrier toward the form to force the material into the recess and upturn the ends of the same about the two ends of the form, a pivoted arm having a rigid terminal finger with an angular inner face corresponding to the exterior of the form at an upper corner and arranged to engage and fold an end of the material against one end of the form and around the upper corner of the same on to the top of the form, a spring pressed arm having a finger arranged to move downwardly on to the top of the form to hold the end of the material closely against the form, another pivoted arm carrying a spring pressed pivoted finger arranged to press the other end of the material against the other end of the form and also carrying a spring pressed pivoted finger arranged to engage over the top of the form to press together the adjacent ends of the material to form a neck, substantially as described.

35. In a box necking machine, the combination of a receiving die, means to feed a strip of adhesive-coated finishing material on to the die, means to feed a strip of foundation material upon the coated side of the finishing strip while on the die, means to press the two strips together to form a duplex strip, means to fold the duplex strip and join the adjacent ends to form a neck, and means to insert the neck within a box comprising a head, jaws slidable radially thereof and having their inner ends disposed adjacent each other, spring means tending to retract the jaws within the periphery of the head, a wedge member disposed within the head and adapted to engage between the adjacent ends of the jaws, the head and wedge member being relatively movable, means to feed boxes to a position in front of the head, means to reciprocate the head to cause the same to enter the box and to expand the same by means of the jaws, means to insert the neck within the expanded box, and means to engage the neck to prevent its withdrawal upon the retraction of the inserting means, substantially as described.

36. In a machine of the character described, the combination of a supply-strip of finishing-material, means to apply to the advance portion of said strip a blank of body-material, means to apply adhesive to one of said materials prior to the application of the one to the other to cause their adhesion together when thus superposed, means to feed said adhered elements thereby bringing said finishing-material strip into position for the reception of the next body-blank, means to sever said finishing-material on a diagonal line, thus severing the duplex-blank from the finishing-material supply-strip, and means to fold said duplex-blank to form a tubular element and secure the adjacent ends together by the diagonally cut projection of said finishing-material, substantially as described.

37. In a machine of the character described, the combination of a supply strip of finishing-material, means to apply to the advance portion of said strip a blank of body-material with a longitudinal edge portion of said finishing-material extended beyond the corresponding edge of the body-blank, means to apply adhesive to one of said materials prior to the application of the one to the other to cause their adhesion together when thus superposed, means to feed said adhered elements thereby feeding said finishing-material strip into position for the reception of the next body-blank, means to fold said extended margin of said finishing-material over the edge of the body-blank, means to sever said finishing-material on a diagonal line, thus severing the duplex-blank from the finishing-material supply strip, and means to fold said duplex-blank to form a tubular element and secure the adjacent ends together by the diagonally cut projection of said finishing-material, substantially as described.

38. In a machine of the character described, the combination of a supply strip of finishing-material, means to apply to the advance portion of said strip a blank of body-material, means to apply adhesive to one of said materials prior to the application of one to the other to cause their adhesion together when thus superposed, means to feed said adhered elements thereby feeding said finishing-material strip into position for the reception of the next body-blank, means to sever said finishing-material on a diagonal line thus severing the duplex-blank from the finishing-material supply strip, means to fold said duplex-blank to form a box-neck and secure the adjacent ends together by the diagonally cut projection of said finishing-material, and means to insert said neck in a box-tray, substantially as described.

39. In a machine of the character described, the combination of a supply strip of finishing-material, means to apply to the advance portion of said strip a blank of body-material with a longitudinal edge portion of said finishing-material extended beyond the corresponding edge of the body-blank, means to apply adhesive to one of said materials prior to the application of the one to the other to cause their adhesion together when thus superposed, means to feed said adhered elements thereby feeding said finishing material strip into position for the reception of the next body-blank, means to fold said extended margin of said finishing-material over the edge of the body-blank, means to sever said finishing-material on a diagonal line thus severing the duplex-blank from the finishing-material supply strip, means to fold said duplex blank to form a box-neck and secure the adjacent ends together by the diagonally cut projection of said finishing-material, and means to insert said neck in a box-tray, substantially as described.

40. In a machine of the character described, the combination of a supply-roll of body-material, a supply-roll of finish-material, means to form successively from sections of said materials flat duplex neck-blanks with a tab of said finish-material strip extended beyond the end of the body-material strip, a rectangular form, means to bend said flat duplex neck-blanks in sequence around said form with a joint at a corner of the form, means to bend said tab of the finish-strip of each neck over said corner-joint and cause it to adhere in place, means to feed a series of box-trays, and means to assemble said box-necks and box-trays, substantially as described.

41. In a machine of the character described, the combination of a supply-roll of body-material, a supply-roll of finish-material, means to form successively from sections of said materials flat duplex neck-blanks with the finish-strip folded over an edge of the body-strip and adhered to its opposite face and with a tab of said finish-material extended beyond the end of the body-strip, a rectangular form, means to bend said flat duplex neck-blanks in sequence around said form with a joint at a corner of the form, means to bend said tab of the finish-strip of each neck over said corner-joint and cause it to adhere in place, means to feed a series of box-trays, and means to telescopically insert said box-necks in said box-trays, substantially as described.

42. In a machine of the character described, the combination of a supply-roll of body-material, a supply-roll of finish-material, means to form successively from sections of said materials flat duplex neck-blanks with the finish-strip folded over an edge of the body-strip and adhered to its opposite face and with a tab of said finish-strip extended beyond the end of the body-strip, a rectangular form, means to bend said flat duplex neck-blanks in sequence around said form and provide a butt-joint of the body-material at a corner of the form, means to bend said tab of the finish-strip of each neck over said butt corner-joint and cause it to adhere in place, means to feed a series of box-trays, and means to telescopically assemble said box-necks and box-trays, substantially as described.

43. In a machine of the character described, the combination of a supply-roll of body-material, a supply-roll of finish-material, means to form successively from sections of said materials flat duplex neck-blanks with the finish-strip folded over a longitudinal edge of the body-strip and adhered to its opposite face and with a tab of said finish-strip extended beyond the end of the body-strip, a rectangular form, means to bend said flat duplex neck-blanks in sequence around said form and bring one end of the body-blank opposite a side of the other end of the blank at a corner of the form, means to bend said tab of the finish-strip of each neck over such butt corner-joint and cause it to adhere in place, means to feed a series of box-trays, and means to telescopically assemble said box-necks and box trays, substantially as described.

44. In a machine of the character described, the combination of a supply-roll of body-material, a supply-roll of finish-material, means to form successively from sections of said materials flat duplex neck-blanks with the finish-strip folded over a longitudinal edge of the body-strip and adhered to its opposite face and with a tab of said finish-strip extended beyond the end of the body-strip, a rectangular form, means to bend said flat duplex neck-blanks in sequence around said form and bring one end of the body-blank opposite a side of the other end of the blank at a corner of the form, means to bend said tab of the finish-strip of each neck over said butt corner-joint and cause it to adhere in place, means to feed a box-tray into register with each neck on the form, and means to telescopically assemble said box-necks and box-trays, substantially as described.

45. In a machine of the character described, the combination of means to feed a series of box-trays, means to form box-necks, means to partially insert one of such necks in each of said trays, and means to cause the partially-necked box-trays to complete the insertion of the necks in the preceding box-trays, substantially as described.

46. In a machine of the character described, the combination of a form, means to bend a box-neck blank around said form to provide a neck, means to support a box-tray, means to advance said form and its neck to cause the insertion of the neck in the box-tray, and means to operate said bending-means permitting them to recede from the form only after the insertion of the neck has begun, substantially as described.

47. In a machine of the character described, the combination of means to form a box-neck, means to support a box-tray, means to expand the mouth of the box-tray to facilitate the insertion of the neck therein, means to insert the neck in the tray, and means to remove the expanding means from the box-tray in contracted condition through such inserted neck, substantially as described.

48. In a machine of the character described, the combination of means to form a box-neck, means to support a box-tray, means to expand the mouth of the box-tray to facilitate the insertion of the neck therein, means to insert the neck in the tray, means to remove the expanding means from the box-tray in contracted condition through such inserted neck, and means to prevent withdrawal of the neck from the tray during such removal of the expanding means, substantially as described.

49. In a machine of the character described, the combination of a form, means to bend a box-neck blank around said form to provide a neck, means to support a box-tray, means to expand the mouth of said tray to facilitate the insertion of the neck therein, means to advance said form and its neck to cause such insertion, means to operate said bending-means permitting them to recede from the form only after the insertion of the neck has begun, and means to remove said expanding-means from the box-tray in contracted condition through such inserted neck, substantially as described.

50. In a machine of the character described, the combination of a form, means to bend a box-neck blank around said form to provide a neck, means to support a box-tray, means to expand the mouth of said tray to facilitate the insertion of the neck therein, means to advance said form and its neck to cause such insertion, means to operate said bending-means permitting them to recede from the form only after the insertion of the neck has begun, means to remove said expanding-means from the box-tray in contracted condition through such inserted neck, and means to prevent withdrawal of the neck from the tray during such removal of the expanding-means, substantially as described.

51. In a machine of the character described, the combination of means to form box-necks, means to feed a series of box-trays, means to expand the mouth of each box-tray to facilitate the insertion of one of the necks therein, means to partially insert one of said necks in each of said trays in succession, means to remove the expanding-means from the box-tray in contracted condition through such partially-inserted neck, and means to complete the insertion of the neck of each box by the succeeding partially-necked box, substantially as described.

52. In a machine of the character described, the combination of a form, benders to bend a box-neck blank around said form, means to operate said benders permitting their retraction from the form only after the neck insertion in the tray has begun, means to support a box-tray in register with said form, means to advance said form and the neck thereon to insert the latter in the tray and to retract said form, and means to prevent withdrawal of the neck from the tray during such removal of the form, substantially as described.

53. In a machine of the character described, the combination of a form, means to bend a box-neck blank around said form to provide a neck, means to support a box-tray in register with said form, expanding-means on said form adapted to enlarge the mouth of the box-tray to facilitate insertion of the neck therein, means to advance said form, expanding-means, and the neck on the form to insert the neck in the tray and to retract said form, means to cause said expanding-means to be in enlarged condition when entering the box-tray and in contracted condition during the withdrawal of the form, and means to prevent withdrawal of the neck from the tray during such removal of the form and expanding-means from the tray, substantially as described.

MICHAEL J. MILMOE.
FRANK B. REDINGTON.

Witnesses:
FRED G. BROOKS,
HELEN M. PATTERSON.